US009316350B2

(12) United States Patent  
Matsuoka

(10) Patent No.: US 9,316,350 B2  
(45) Date of Patent: Apr. 19, 2016

(54) EXTENDABLE ARM AND STRUCTURE USING THE SAME

(71) Applicant: FUJIMIYASEISAKUSHO CO., LTD., Kumamoto (JP)

(72) Inventor: Norimichi Matsuoka, Kumamoto (JP)

(73) Assignee: FUJIMIYASEISAKUSHO CO., LTD., Kumamoto (JP)

( * ) Notice: Subject to any disclaimer, the term of this patent is extended or adjusted under 35 U.S.C. 154(b) by 0 days.

(21) Appl. No.: 14/421,712

(22) PCT Filed: Dec. 5, 2013

(86) PCT No.: PCT/JP2013/082655  
§ 371 (c)(1),  
(2) Date: Feb. 13, 2015

(87) PCT Pub. No.: WO2014/115428  
PCT Pub. Date: Jul. 31, 2014

(65) Prior Publication Data  
US 2015/0300560 A1    Oct. 22, 2015

(30) Foreign Application Priority Data

Jan. 28, 2013 (JP) .................................. 2013-013269  
Nov. 19, 2013 (JP) .................................. 2013-239210

(51) Int. Cl.  
*E04G 3/00*      (2006.01)  
*F16M 13/02*    (2006.01)  
(Continued)

(52) U.S. Cl.  
CPC ............ *F16M 13/022* (2013.01); *A47B 23/007* (2013.01); *A47B 23/025* (2013.01);  
(Continued)

(58) Field of Classification Search  
CPC . F16M 13/022; F16M 13/02; F16M 11/2092; F16M 11/38; F16M 11/10; F16M 11/2014; F16M 2200/061; F21V 21/26; F21V 21/24; A45D 20/12  
USPC .............................. 248/277.1, 274.1, 584, 585  
See application file for complete search history.

(56) References Cited

U.S. PATENT DOCUMENTS 2,013,882 A * 9/1935 Francis ................ A47B 23/007  
                                                                                                                                          248/229.24  
3,168,791 A * 2/1965 Nutting ................ A47B 23/007  
                                                                                                                                          248/188.1  
(Continued)

FOREIGN PATENT DOCUMENTS

JP      S50-033126 U    4/1975  
JP      S52-003079 U    1/1977  
(Continued)

OTHER PUBLICATIONS

International Search Report for corresponding International Application No. PCT/JP2013/082655, mailed Mar. 11, 2014.

*Primary Examiner* — Todd M Epps  
(74) *Attorney, Agent, or Firm* — Hauptman Ham, LLP

(57) ABSTRACT

An extendable arm (30) is formed by a plurality of cross units (31) arranged in one direction and pivotally coupled to each other, and each of the cross units is formed by two rigid members (31a, 31b) that are pivotally coupled at a central coupling point (c) so as to cross over each other to form an X-shape. In order for the extendable arm (30) to follow a curved-line path when being extended and contracted, each of the rigid members (31a, 31b) has such a curved shape that coupling points (d, e) at both ends of the rigid member are shifted toward one side from a longitudinal axis passing through the central coupling point (c).

26 Claims, 36 Drawing Sheets

(51) Int. Cl.
*B25J 18/02* (2006.01)
*F21V 21/24* (2006.01)
*F16M 11/20* (2006.01)
*F16M 11/38* (2006.01)
*A47B 23/00* (2006.01)
*A47B 23/02* (2006.01)
*A47C 21/00* (2006.01)
*A63H 33/00* (2006.01)
*F21V 21/26* (2006.01)
*F16M 11/10* (2006.01)
*F21S 6/00* (2006.01)
*F21W 121/04* (2006.01)

(52) U.S. Cl.
CPC .............. *A47C 21/00* (2013.01); *A47C 21/003* (2013.01); *A63H 33/00* (2013.01); *B25J 18/02* (2013.01); *F16M 11/10* (2013.01); *F16M 11/2014* (2013.01); *F16M 11/2092* (2013.01); *F16M 11/38* (2013.01); *F16M 13/02* (2013.01); *F21V 21/24* (2013.01); *F21V 21/26* (2013.01); *F16M 2200/061* (2013.01); *F21S 6/00* (2013.01); *F21W 2121/04* (2013.01)

(56) References Cited

U.S. PATENT DOCUMENTS 6,061,923 A * 5/2000 Case ................... A45D 20/12 248/277.1
D555,202 S * 11/2007 Siegel ............................ D19/90
7,896,088 B2 * 3/2011 Guerrero .................. E21B 4/18 166/206
8,291,781 B2 * 10/2012 Guerrero ................. E04B 1/344 74/25
8,733,453 B2 * 5/2014 Guerrero .................. E21B 4/18 166/207
2009/0158674 A1 6/2009 Guerrero et al.
2009/0159295 A1 6/2009 Guerrero et al.
2010/0243274 A1 9/2010 Guerrero et al.
2011/0132626 A1 6/2011 Guerrero et al.
2013/0025215 A1 1/2013 Guerrero et al.

FOREIGN PATENT DOCUMENTS

| JP | 554-117081 U | 12/1979 |
| JP | S57-107788 | 7/1982 |
| JP | S61-003409 U | 1/1986 |
| JP | S62-166985 A | 7/1987 |
| JP | S64-020606 U | 2/1989 |
| JP | H1-159036 U | 11/1989 |
| JP | H11151124 A | 6/1999 |
| JP | 2006052603 A | 2/2006 |
| JP | 3174754 U | 4/2012 |

* cited by examiner

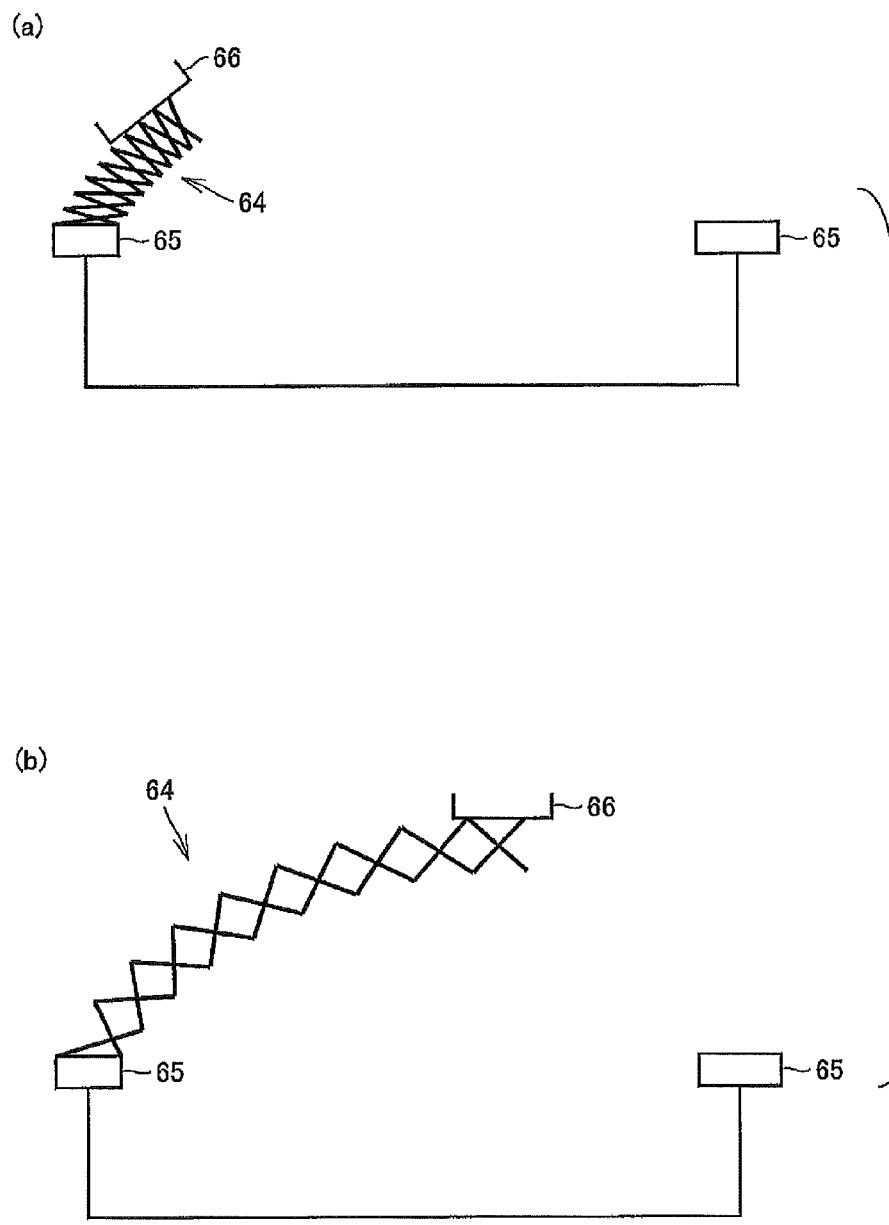
FIG. 27
FIG. 28
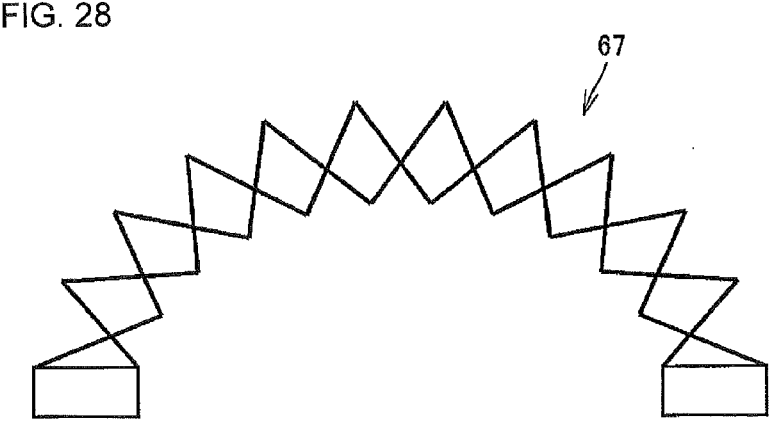

EXTENDABLE ARM AND STRUCTURE USING THE SAME

TECHNICAL FIELD

The present invention relates to extendable arms that can be extended and contracted, and more particularly to extendable arms in which a plurality of cross units each having an X-shape are arranged in one direction and are pivotally coupled to each other.

BACKGROUND ART

Extendable arms are widely used in various kinds of industrial equipment, devices related to daily life, medical-related devices, etc., such as arms of industrial robots, stands of lighting devices, arms supporting a stand on which an article is placed.

A typical extendable arm is formed by a plurality of cross units arranged in one direction and pivotally coupled to each other. Each of the cross units is formed by two linear plate members crossed over each other at their centers so as to form an X-shape and pivotally coupled together at the intersection via a shaft. The extendable arm having such a structure can be extended and contracted in a linear direction.

In some applications, the extendable arm may be extended and contracted in a curved direction. Such extendable arms that are extended and contracted in a curved direction are disclosed in, e.g., Japanese Unexamined Utility Model Application Publication No. H01-159036 (PTL 1) and Japanese Unexamined Patent Application Publication No. 2006-52603 (PTL 2).

The extendable arm disclosed in Japanese Unexamined Utility Model Application Publication No. H01-159036 (PTL 1) is used in a front roll-up type movable tent that is deployed so that canvas forms a curve in an intermediate part of the tent. In the front roll-up type movable tent disclosed in this publication, the canvas is attached to extend between a base bar and a front bar, the front bar is rotatably disposed between the tip ends of extendable arms, and a motor that rotates the front bar in the forward and reverse directions is coupled to the front bar. Each of the extendable arms is formed by a plurality of cross units arranged in one direction and pivotally coupled to each other, and each of the cross units is formed by two linear plate members that are crossed over each other to form an X-shape.

When in a deployed state, the canvas has a curved region in an intermediate part thereof. Each of those cross units which are located in the curved region is provided so that its crossing shaft coupling the two plate members is provided at a position shifted from the centers of the plate members, in order to allow the cross units to be located along such a deployment path of the canvas. The length from the crossing shaft to the outer end of each plate member is greater than that from the crossing shaft to the inner end of each plate member. Accordingly, when the plurality of cross units coupled to each other are deployed, an imaginary line connecting the outer ends of the plate units is curved with a relatively large radius of curvature, and an imaginary line connecting the inner ends of the plate units is curved with a relatively small radius of curvature.

FIG. 12 of Japanese Unexamined Patent Application Publication No. 2006-52603 (PTL 2) shows a telescopic multi-stage extendable structure having an arch shape that is curved with a predetermined radius of curvature. The extendable structure is formed by placing between a pair of cylindrical arms an extendable mechanism including cross units coupled to each other. Each cylindrical arm is made extendable by telescopically fitting a plurality of cylindrical members having the shape of a bent pipe on each other. Each cylindrical arm thus forms an arch shape when extended. Both ends in the lateral direction of the extendable mechanism including the cross units are pivotally coupled to the cylindrical arms.

CITATION LIST

Patent Literatures

PTL 1: Japanese Unexamined Utility Model Application Publication No. H01-159036
PTL 2: Japanese Unexamined Patent Application Publication No. 2006-52603

SUMMARY OF INVENTION

Technical Problem

In the extendable arm disclosed in Japanese Unexamined Utility Model Application Publication No. H01-159036 (PTL 1), the crossing shafts of the cross units are provided at the positions shifted from the centers of the plate members so that the extendable arm forms a curved shape. In the extendable arm having the crossing shafts shifted from the centers, the length from the crossing shaft to the outer end of the cross member is greater than that from the crossing shaft to the inner end of the cross member. The extended arm is therefore unbalanced in structure.

The extendable structure disclosed in Japanese Unexamined Patent Application Publication No. 2006-52603 (PTL 2), each cross unit is formed by two linear plate members crossed over each other at their central portions and coupled together. The extendable structure is therefore balanced in structure. The extendable arm formed by the cross units coupled in one direction is extended and contracted in a linear direction. However, both ends of the extendable arm are coupled to the telescopic cylindrical arms that have the shape of a bent pipe and that form an arch shape when in a deployed state. Each member forming the extendable arm is therefore subjected to an unnatural force that is generated due to the difference between the original operation of the extendable arm and the original operation of the telescopic cylindrical arms.

The present invention was developed to solve the above problems, and it is an object of the present invention to provide an extendable arm capable of forming a curved shape in a satisfactorily balanced manner and with a structure that is not subjected to an unnatural force.

Solution to Problem

An extendable arm according to the present invention is formed by a plurality of cross units arranged in one direction and pivotally coupled to each other, and each of the cross units is formed by two rigid members that are pivotally coupled at a central coupling point so as to cross over each other to form an X-shape. In order for the extendable arm to follow a curved-line path when being extended and contracted, each of the rigid members has such a curved shape that coupling points at both ends of the rigid member are shifted toward one side from a longitudinal axis passing through the central coupling point.

In one embodiment, the coupling points at both ends of the rigid member are shifted in a lateral direction of the rigid member. In another embodiment, the coupling points at both ends of the rigid member are shifted in a thickness direction of the rigid member. In this case, the rigid member preferably has such a curved shape that an axis in the thickness direction which passes through the central coupling point of the rigid member and axes in the thickness direction which pass through the coupling points at both ends of the rigid member converge on the axis in the thickness direction which passes through the central coupling point.

In a preferred embodiment, the rigid member is curved with a uniform radius of curvature along its entire longitudinal length. In another embodiment, the rigid member has a linear shape in its central region in a longitudinal direction of the rigid member.

A three-dimensional object may be formed by using the above extendable arm. In one embodiment, a three-dimensional shape that is formed by the extendable arm in a deployed state forms a surface selected from the group consisting of a cylindrical surface, a conical surface, and a spherical surface. In another embodiment, a three-dimensional shape that is formed by the extendable arm in a deployed state forms a shape selected from the group consisting of an arc shape, a helical shape, an arch shape, and a wave shape. An example of the three-dimensional object is a partition that is formed by coupling a plurality of extendable arms in a lateral direction crossing a longitudinal direction.

A desk lamp according to a preferred embodiment of the present invention includes: an extendable arm; and a lighting unit attached to a tip end of the extendable arm. The extendable arm is formed by a plurality of cross units arranged in one direction and pivotally coupled to each other, and each of the cross units is formed by two rigid members that are pivotally coupled at a central coupling point so as to cross over each other to form an X-shape. In order for the extendable arm to follow a curved-line path when being extended and contracted, each of the rigid members has such a curved shape that coupling points at both ends of the rigid member are shifted toward one side from a longitudinal axis passing through the central coupling point.

In an example of the desk lamp, the coupling points at both ends of the rigid member are shifted in a lateral direction of the rigid member, and a direction in which the lighting unit emits light is the same regardless of whether the extendable arm is in an extended state or in a contracted state. In another example of the desk lamp, the coupling points at both ends of the rigid member are shifted in a thickness direction of the rigid member, and the lighting unit emits light to the same position regardless of whether the extendable arm is in an extended state or in a contracted state.

Typically, the desk lamp further includes: a base member supporting a base end of the extendable arm and containing a power supply control unit; and an electrical cord extending from the base member to the lighting unit. Preferably, the electrical cord extends through the extendable arm within a range of a thickness of the extendable arm.

A bed structure with an extendable arm according to a preferred embodiment of the present invention includes: a bed; an extendable arm that can be extended and contracted and that extends in a greatly curved shape from a side of the bed to a position above a face of a person lying on the bed when in an extended state; and an article holding member attached to the extendable arm. The extendable arm is formed by a plurality of cross units arranged in one direction and pivotally coupled to each other, and each of the cross units is formed by two rigid members that are pivotally coupled at a central coupling point so as to cross over each other to form an X-shape. In order for the extendable arm to follow a curved-line path when being extended and contracted, each of the rigid members has such a curved shape that coupling points at both ends of the rigid member are shifted toward one side from a longitudinal axis passing through the central coupling point.

In an example of the bed structure with the extendable arm, the coupling points at both ends of the rigid member are shifted in a thickness direction of the rigid member. The article holding member holds a visual object. The visual object held by the article holding member always provides a visual surface that faces toward the face of the person lying on the bed regardless of whether the extendable arm is in an extended state or in a contracted state. As used herein, the term "visual object" typically refers to a television set, a display, etc., but is herein intended to also include audiovisual objects and auditory objects which produce sound.

For example, the bed structure with the extendable arm further includes a base member that is fixed to the bed, and a base end of the extendable arm is rotatably supported by the base member.

Preferably, a coupling structure of the extendable arm and the article holding member is configured so that an angle of the article holding member with respect to a longitudinal axis of the extendable arm changes according to an extension/contraction operation of the extendable arm. In one embodiment, one rigid member located at a tip end of the extendable arm is coupled at a fixed angle to the article holding member, and the angle of the article holding member with respect to the longitudinal axis of the extendable arm changes according to an extension/contraction length of the extendable arm.

An article holding device according to a preferred embodiment of the present invention includes: an extendable arm that can be extended and contracted and that extends in a greatly curved shape when in an extended state; and an article holder attached to the extendable arm. The extendable arm is formed by a plurality of cross units arranged in one direction and pivotally coupled to each other, and each of the cross units is formed by two rigid members that are pivotally coupled at a central coupling point so as to cross over each other to form an X-shape. In order for the extendable arm to follow a curved-line path when being extended and contracted, each of the rigid members has such a curved shape that coupling points at both ends of the rigid member are shifted toward one side from a longitudinal axis passing through the central coupling point.

Advantageous Effects of Invention

According to the extendable arm of the present invention, in order for the extendable arm to follow a curved-line path when being extended and contracted, each of the rigid members forming the cross units has such a curved shape that the coupling points at both ends of the rigid member are shifted toward one side from the longitudinal axis passing through the central coupling point. The extendable arm can therefore form a curved shape in a satisfactorily balanced manner and with a structure that is not subjected to an unnatural force.

BRIEF DESCRIPTION OF DRAWINGS

FIG. 6(a) is a plan view, FIG. 6(b) is a front view, and FIG. 6(c) is a sectional view taken along line c-c.

FIG. 10(a) is a plan view, FIG. 10(b) is a front view, and FIG. 10(c) is a sectional view taken along line c-c.

FIG. 15(a) is a plan view, FIG. 15(b) is a front view, and FIG. 15(c) is a sectional view taken along line c-c.

FIG. 22(a) is a plan view, and FIG. 22(b) is a front view.

FIG. 23(a) shows a contracted state, and FIG. 23(b) shows an extended state.

FIG. 24(a) shows a contracted state, and FIG. 24(b) shows an extended state.

FIG. 25(a) shows a contracted state, and FIG. 25(b) shows an extended state.

FIGS. 27(a) and 27(b) are illustrations showing an example of using an extendable arm for a beverage tray on an armrest of a seat, where FIG. 27(a) shows a contracted state, and FIG. 27(b) shows an extended state.

FIG. 28 is an illustration showing an example of using an extendable arm for an arched bridge.

FIG. 30(a) is a plan view, and FIG. 30(b) is a side view.

FIG. 45(a) shows a person lying on a bed as viewed from the side, and FIG. 45(b) shows the person lying on the bed as viewed from the top of his/her head.

DESCRIPTION OF EMBODIMENTS

<First Embodiment>

Figure 1:
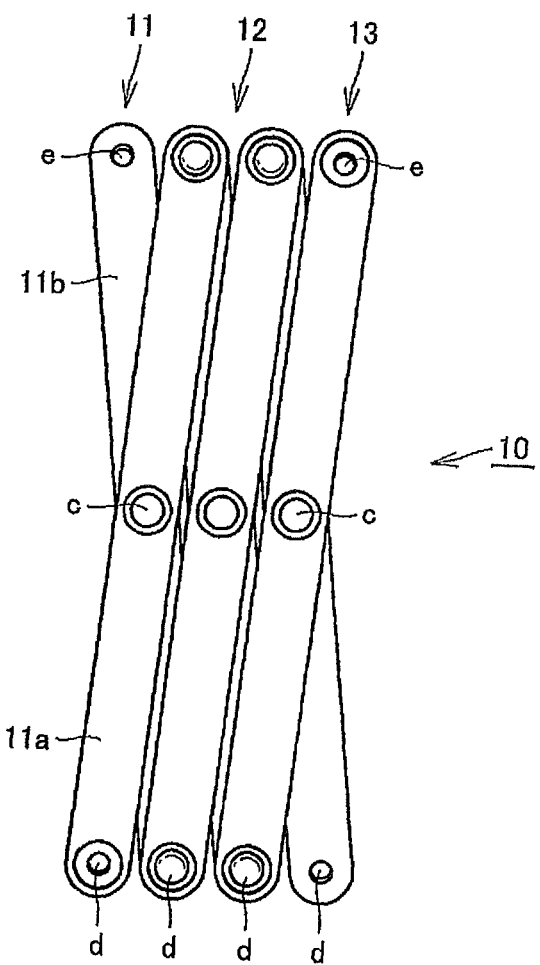
FIG. 1 is a plan view of an extendable arm according to a first embodiment of the present invention which is in a contracted state.
Figure 2:
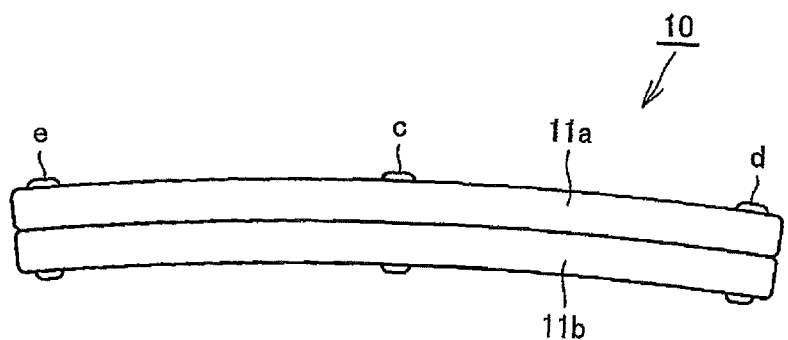
FIG. 2 is a front view of the extendable arm of the first embodiment which is in the contracted state.

An extendable arm according to a first embodiment of the present invention will be described with reference to FIGS. 1 to 6 and FIG. 16.

An extendable arm 10 is formed by a plurality of cross units 11, 12, 13 arranged in one direction and pivotally coupled to each other. Since the plurality of cross units 11, 12, 13 have the same structure, one cross unit 11 will be described representatively in order to avoid repetitive description.

The cross unit 11 is formed by two rigid members 11a, 11b that are pivotally coupled at a central coupling point c so as to cross over each other to form an X-shape. Each rigid member 11a, 11b has coupling points d, e at both ends thereof. In order for the extendable arm 10 to follow a curved-line path when being extended and contracted, each rigid member 11a, 11b has such a curved shape that the coupling points d, e at both ends thereof are shifted toward one side from a longitudinal axis passing through the central coupling point c. Preferably, the distance between the central coupling point c and the coupling point d at one end is the same as that between the central coupling point c and the coupling point e at the other end.

Figure 16:
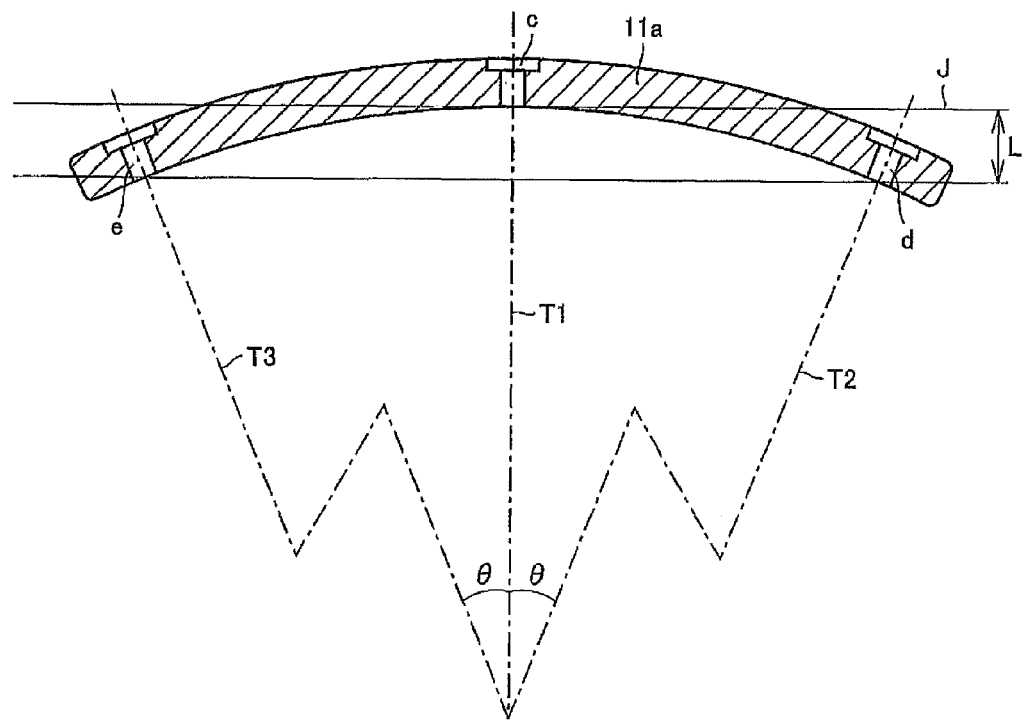
FIG. 16 is a sectional view of a rigid member curved in the thickness direction with a uniform radius of curvature.

In the extendable arm 10 of the first embodiment, as shown in FIGS. 6(a) to 6(c) and FIG. 16, each rigid member 11a has a linear shape as viewed in plan, but is curved with a uniform radius of curvature along its entire longitudinal length as viewed from the front. In FIG. 16, the curvature is shown exaggerated in order to facilitate understanding. Each rigid member 11a is curved in the thickness direction, and the coupling points d, e at both ends are shifted by a distance L toward one side in the thickness direction from a longitudinal axis J passing through the central coupling point c and extending linearly in the longitudinal direction. As shown in FIG. 16, in a preferred embodiment, each rigid member 11a has such a curved shape that an axis T1 in the thickness direction which passes through the central coupling point c of the rigid member 11a and axes T2, T3 in the thickness direction which pass through the coupling points d, e at both ends of the rigid member 11a converge on the axis T1 in the thickness direction which passes through the central coupling point c. The direction of an axis in the thickness direction at each coupling point matches the axial direction of a shaft that pivotally couples at the coupling point two rigid members crossing over each other.

Figure 3:
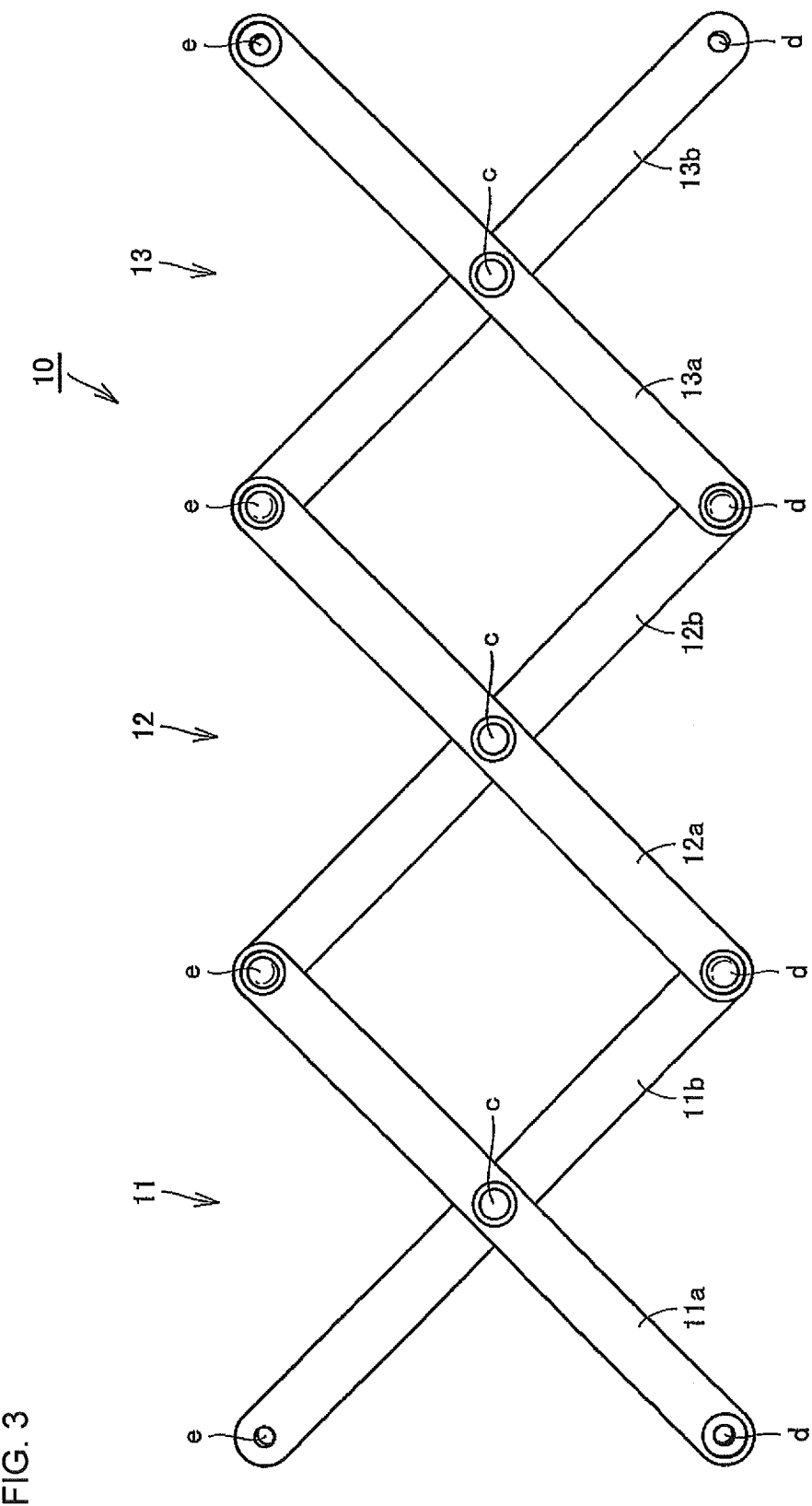
FIG. 3 is a plan view of the extendable arm of the first embodiment which is in an extended state.
Figure 4:
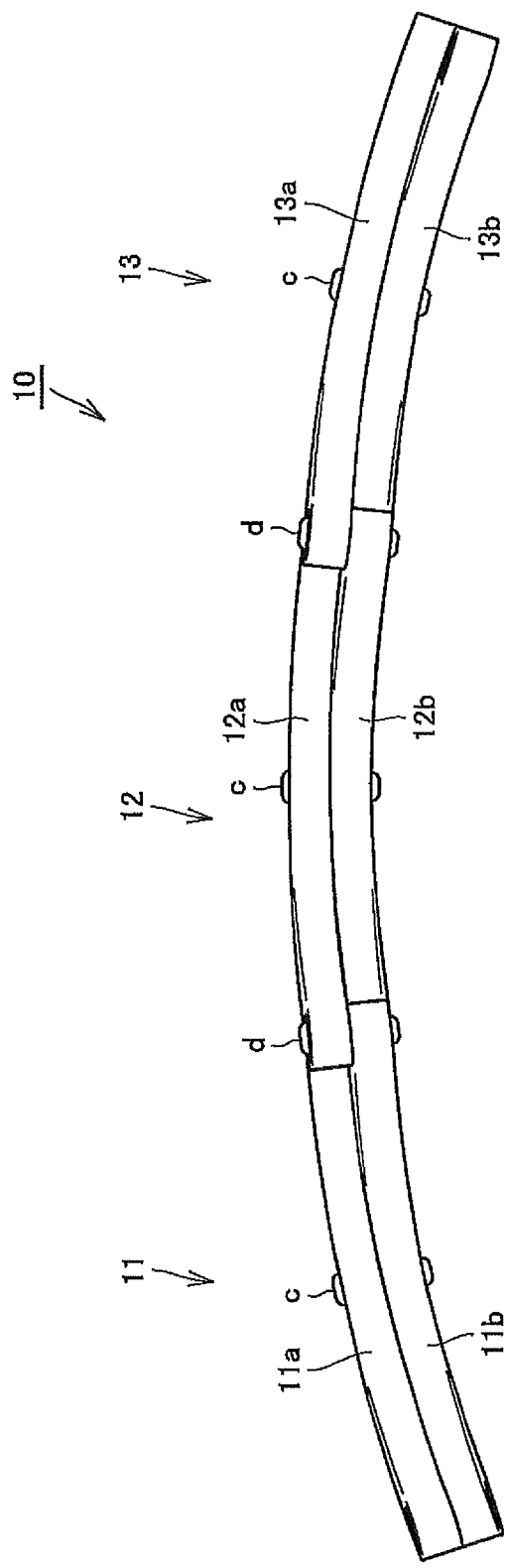
FIG. 4 is a front view of the extendable arm of the first embodiment which is in the extended state.
Figure 5:
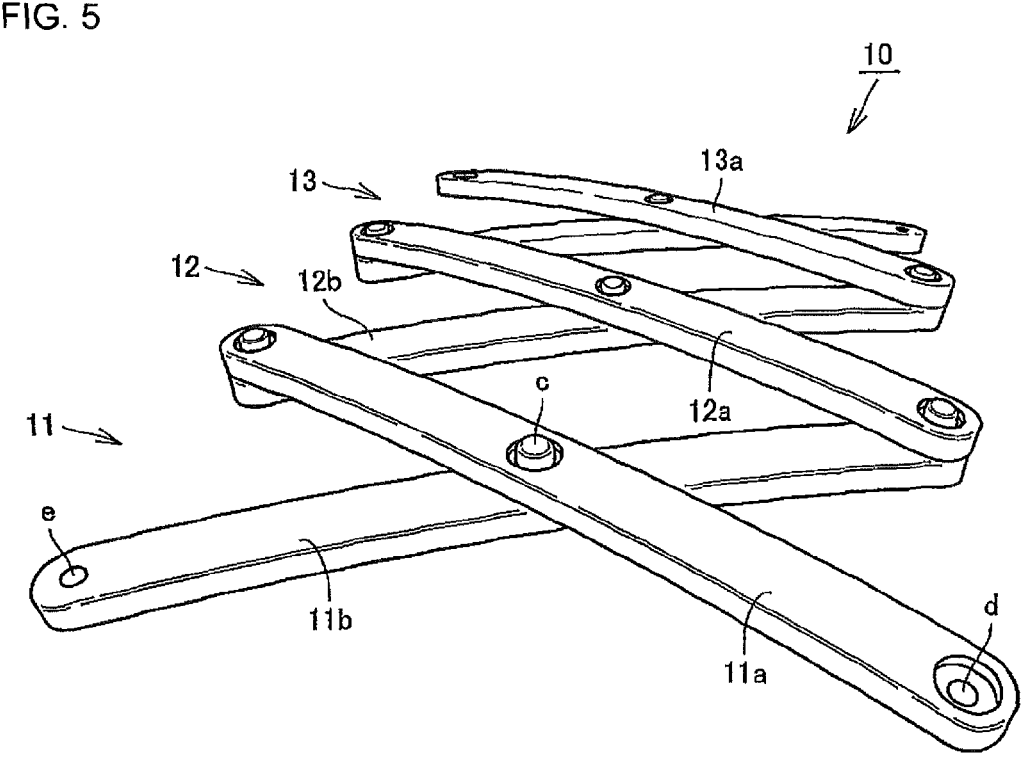
FIG. 5 is a perspective view of the extendable arm of the first embodiment which is in a slightly extended state.
Figure 6:
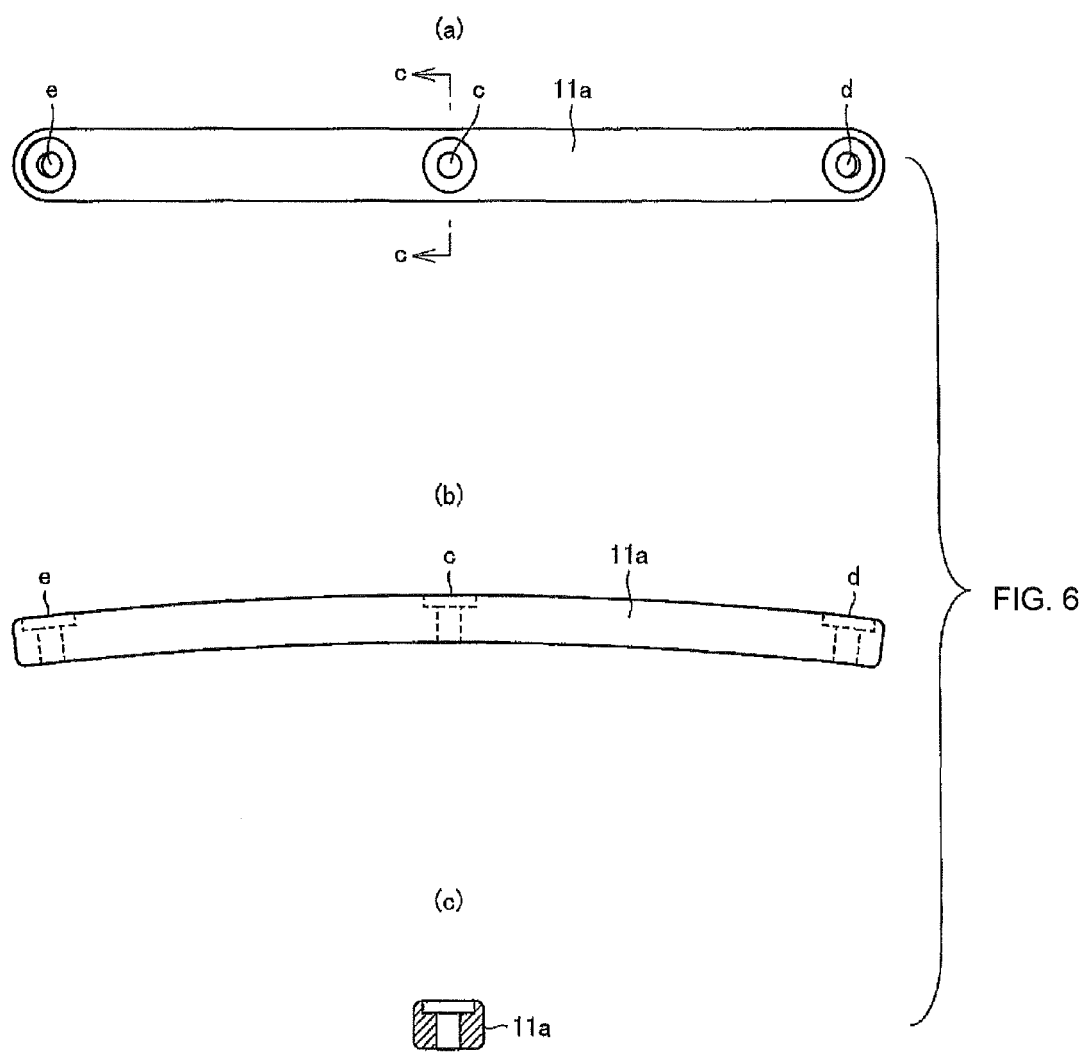
FIGS. 6(a) to 6(c) are diagrams showing a rigid member forming the extendable arm of the first embodiment, where

As shown in FIG. 3, the extendable arm 10 of the first embodiment extends linearly as viewed in plan when in the extended state. As shown in FIG. 4, however, the extendable arm 10 is curved in the thickness direction with a uniform radius of curvature as viewed from the front when in the extended state. The radius of curvature of the curved surface in the extended state is substantially the same as the radius of curvature of each rigid member 11a.

Figure 17:
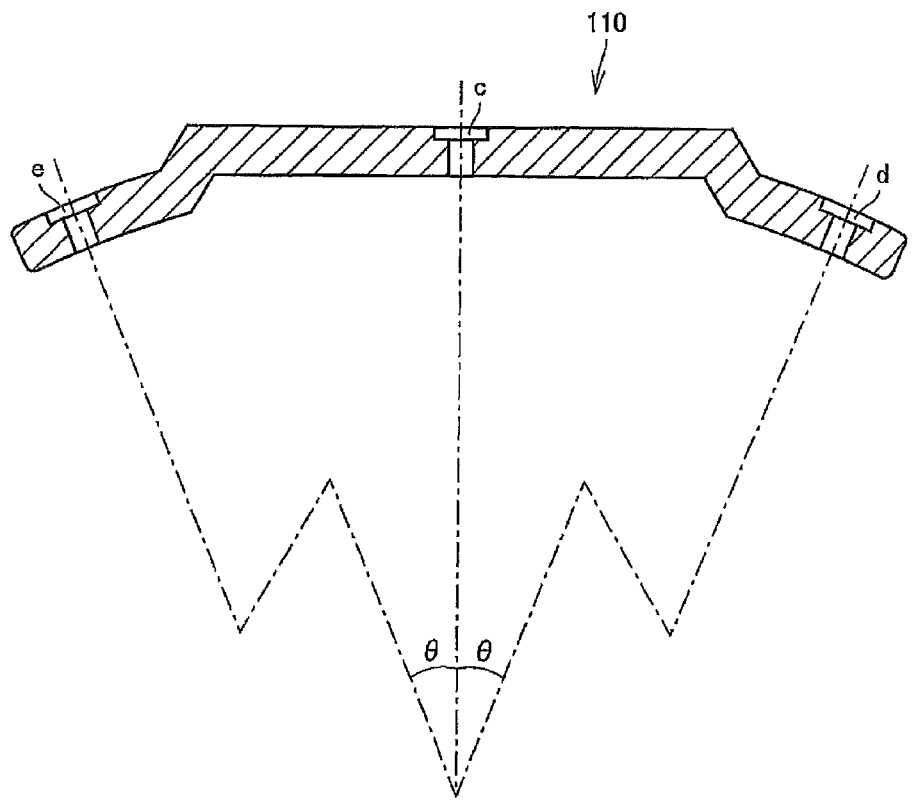
FIG. 17 is a sectional view of a rigid member that has a linear shape in its central region in the longitudinal direction, but is curved in the thickness direction as a whole.

FIG. 17 shows another example of the rigid member for use in the extendable arm that is curved in the thickness direction. A rigid member 110 shown in FIG. 17 has a linear shape in its central region in the longitudinal direction, but is curved in the thickness direction at both ends, so that the overall shape of the rigid member 110 is a curved shape. In the case of the rigid member of FIG. 17 as well, the three axes in the thickness direction which pass through the central coupling point c and the coupling points d, e at both ends are converged at one point.

<Second Embodiment>

An extendable arm according to a second embodiment of the present invention will be described with reference to FIGS. 7 to 10 and FIGS. 18 and 19.

Figure 7:
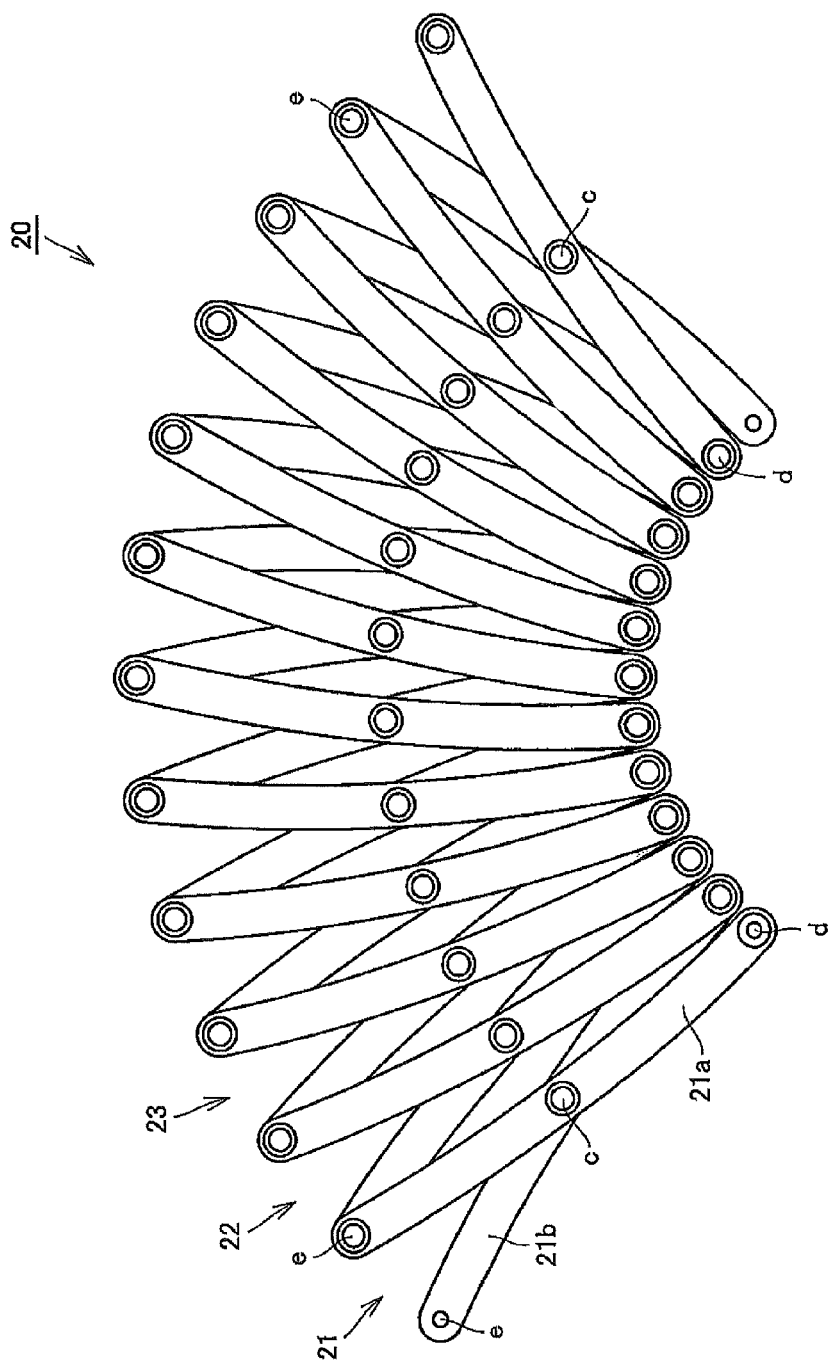
FIG. 7 is a plan view of an extendable arm according to a second embodiment of the present invention which is in a contracted state.

In the present embodiment as well, an extendable arm 20 is formed by a plurality of cross units 21, 22, 23 arranged in one direction and pivotally coupled to each other. As a representative example, the cross unit 21 is formed by two rigid members 21a, 21b that have a curved shape as viewed in plan, namely that are curved in the lateral direction as viewed in plan, and that are pivotally coupled at the central coupling point c so as to cross over each other to form an X-shape. One rigid member 21a and the other rigid member 21b are curved in opposite directions to each other. In FIG. 7, one rigid member 21a has a curved shape that is convex to the left, and the other rigid member 21b has a curved shape that is convex to the right. Accordingly, the interval between the two rigid members 21a, 21b at one end (the upper end in FIG. 7) of the cross unit 21 is larger than that between the two rigid members 21a, 21b at the other end (the lower end in FIG. 7) of the cross unit 21. The overall shape of the extendable arm 20 is therefore a curved shape that is convex upward.

Figure 8:
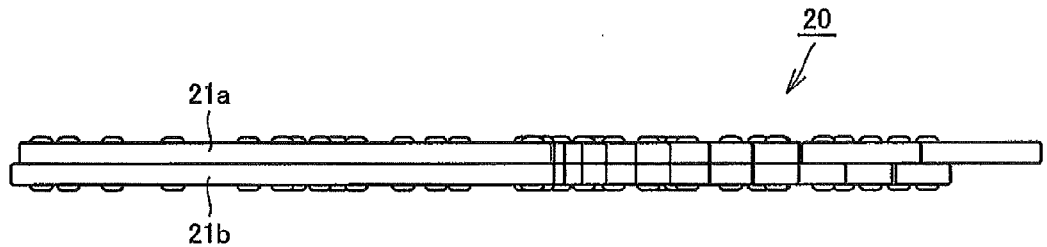
FIG. 8 is a front view of the extendable arm of the second embodiment which is in the contracted state.

As shown in FIGS. 10(a) to 10(c), each rigid member 21a, 21b has a curved shape (curved in the lateral direction) as viewed in plan in FIG. 10(a), but has a linear shape with a uniform thickness as viewed from the front in FIG. 10(b). Accordingly, in the extendable arm 20 formed by coupling the plurality of cross units 21, 22, 23, the upper and lower surfaces in the thickness direction of the extendable arm 20 are flat and parallel to each other, as shown in FIG. 8.

Figure 9:
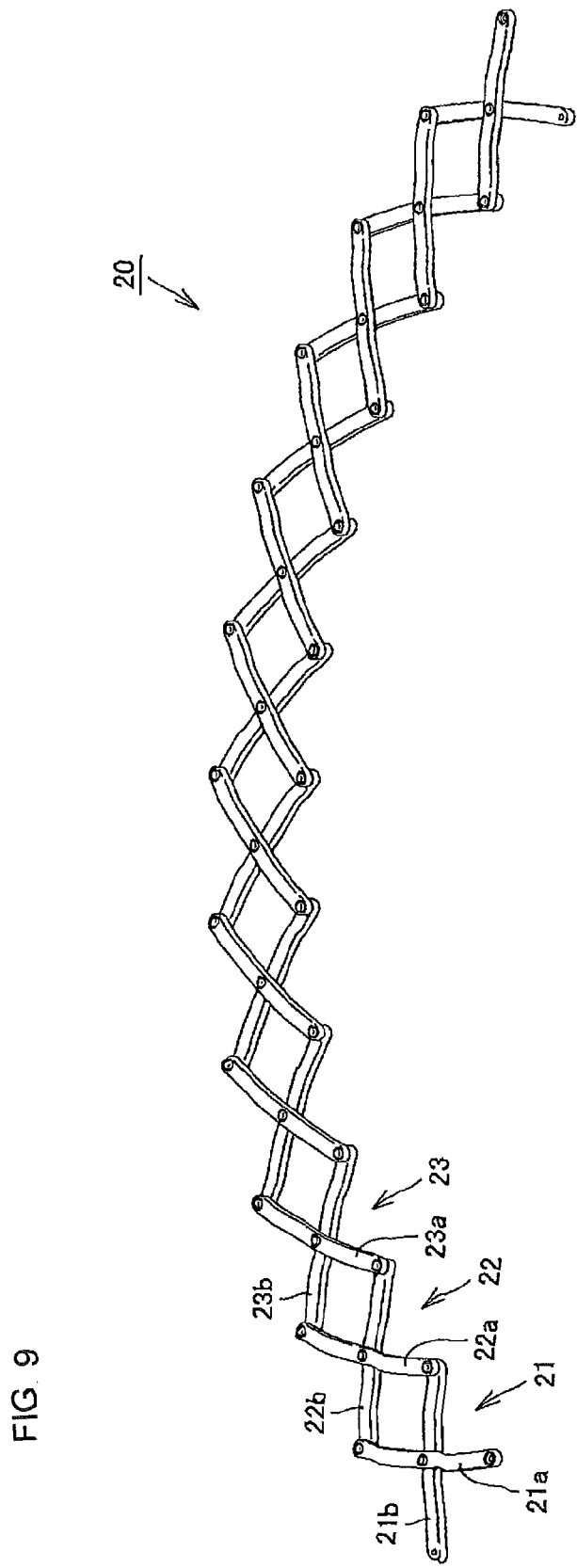
FIG. 9 is a perspective view of the extendable arm of the second embodiment which is in an extended state.
Figure 10:
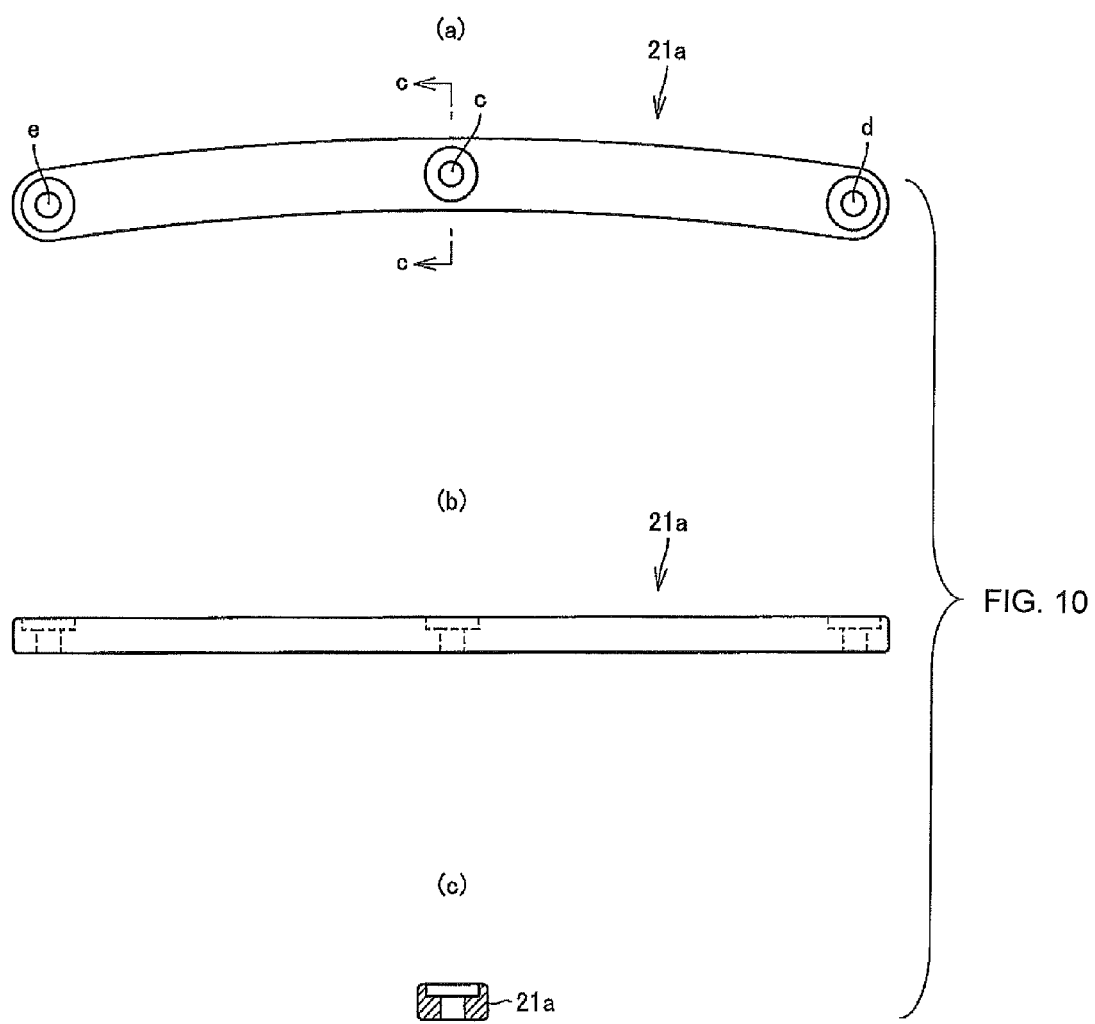
FIGS. 10(a) to 10(c) are diagrams showing a rigid member forming the extendable arm of the second embodiment, where

As shown in FIG. 9, when in the extended state, the extendable arm 20 does not change in thickness in the thickness direction, and forms a curved shape that is large in the lateral direction.

Figure 18:
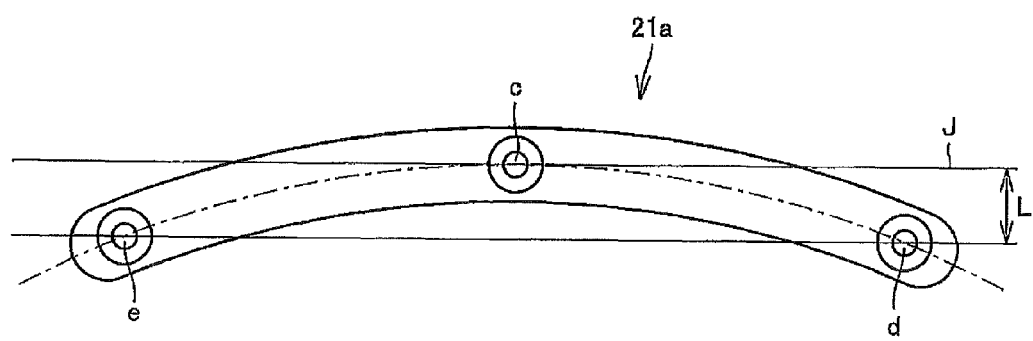
FIG. 18 is a plan view of a rigid member curved in the lateral direction with a uniform radius of curvature.

As shown in FIG. 18, in the rigid member 21a of the extendable arm 20 of the second embodiment, the coupling points d, e at both ends thereof are shifted by the distance L toward one side in the lateral direction from the longitudinal axis J passing through the central coupling point and extending linearly in the longitudinal direction. The rigid member 21a is curved with a uniform radius of curvature along its entire longitudinal length.

Figure 19:
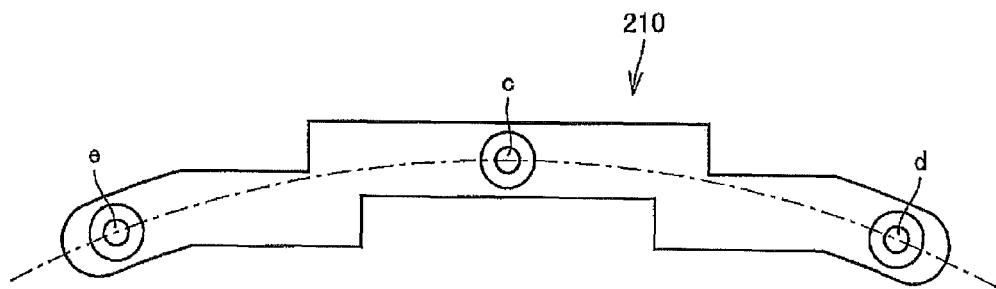
FIG. 19 is a plan view of a rigid member that has a linear shape in its central region in the longitudinal direction, but is curved in the lateral direction as a whole.

FIG. 19 shows another example of the rigid member for use in the extendable arm that is curved in the lateral direction. A rigid member 210 shown in FIG. 19 has a linear shape in its central region in the longitudinal direction, but is curved in the lateral direction at both ends, so that the overall shape of the rigid member 210 is a curved shape. In the case of the rigid member of FIG. 19 as well, a line that passes through the central coupling point c and the coupling points d, e at both ends is curved.

<Third Embodiment>

An extendable arm according to a third embodiment of the present invention will be described with reference to FIGS. 11 to 15. As in the above embodiments, an extendable arm 30 of the present embodiment is formed by a plurality of cross units 31, 32, 33 arranged in one direction and pivotally coupled to each other. In order for the extendable arm 30 to follow a curved-line path when being extended and contracted, each rigid member 31a, 31b forming the cross unit 31 is formed so that the coupling points d, e at both ends thereof are shifted toward one side from a longitudinal axis passing through the central coupling point c. Each rigid member 31a, 31b of the present embodiment is curved in the thickness direction and in the lateral direction.

FIG. 15(a) is a plan view of one rigid member 31a. As shown in the figure, a longitudinal axis J1 that passes through the coupling points d, e at both ends is shifted by a distance L1 from a longitudinal axis J2 that passes through the central coupling point c, as viewed in plan.

Figure 11:
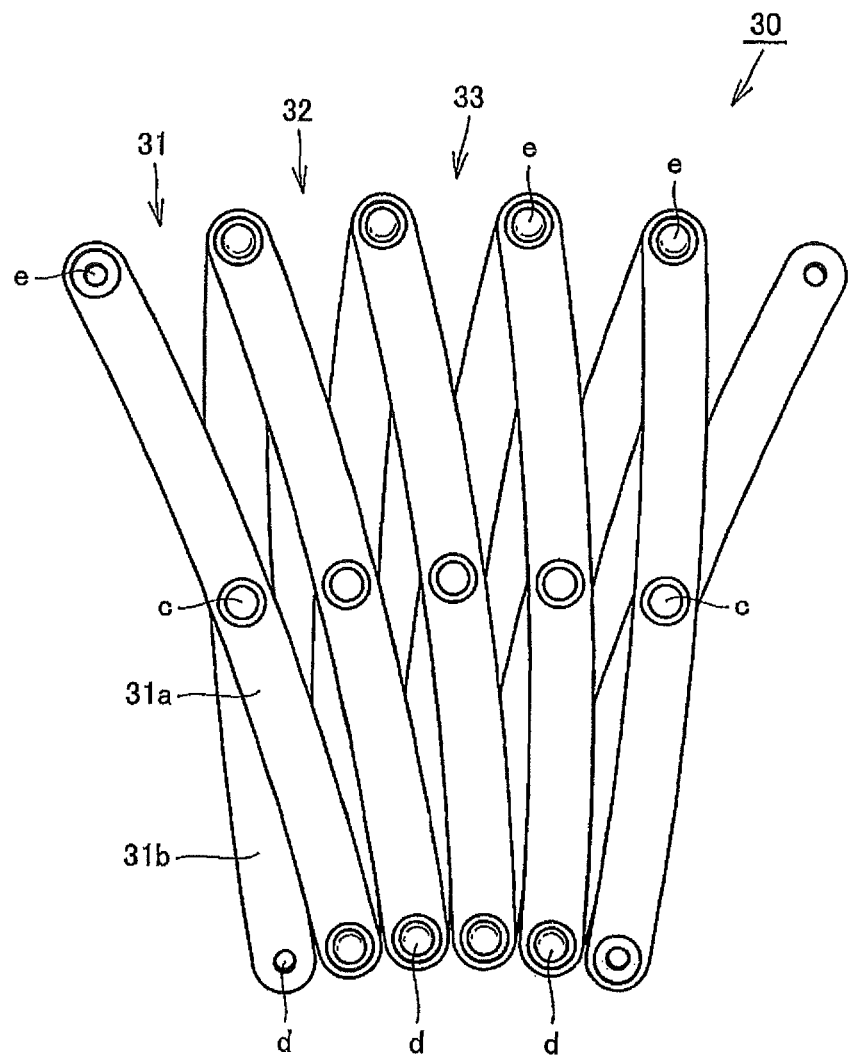
FIG. 11 is a plan view of an extendable arm according to a third embodiment of the present invention which is in a contracted state.

As shown in FIG. 11, one rigid member 31a and the other rigid member 31b of the cross unit 31 are curved in opposite directions to each other. In FIG. 11, one rigid member 31a has a curved shape that is convex to the right, and the other rigid member 31b has a curved shape that is convex to the left. Accordingly, the interval between the two rigid members 31a, 31b at one end (the upper end in the figure) of the cross unit 31 is larger than that between the two rigid members 31a, 31b at the other end (the lower end in the figure) of the cross unit 31. The overall shape of the extendable arm 30 is therefore a curved shape that is convex upward.

Figure 12:
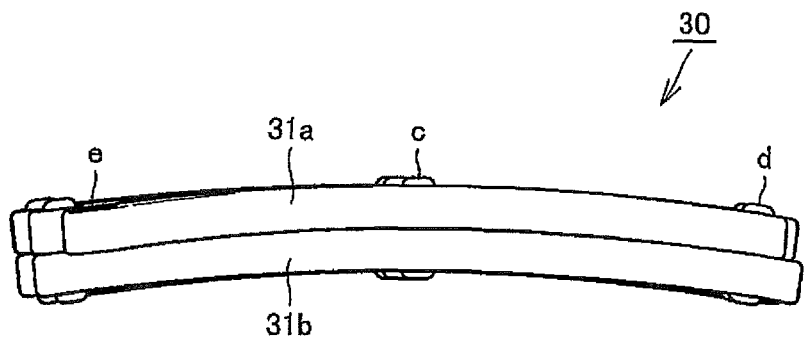
FIG. 12 is a front view of the extendable arm of the third embodiment which is in the contracted state.

As shown in FIGS. 12 and 15(b), each rigid member 31a, 31b is curved also in the thickness direction. In the front view of FIG. 15(b), a longitudinal axis J3 that passes through the coupling points d, e at both ends is shifted by a distance L2 from a longitudinal axis J4 that passes through the central coupling point c.

In the illustrated example, as shown in FIG. 15(a), the rigid member 31a is shaped so as to protrude in the lateral direction at the coupling points d, e at both ends. Namely, the rigid member 31a is curved in the lateral direction. The rigid member 31a is uniformly curved with a fixed radius of curvature along its entire longitudinal length. As shown in FIG. 15(b), the rigid member 31a is shaped so as to protrude in the thickness direction at the coupling points d, e at both ends. Namely, the rigid member 31a is curved in the thickness direction. The rigid member 31a is uniformly curved with a fixed radius of curvature along its entire longitudinal length.

Figure 13:
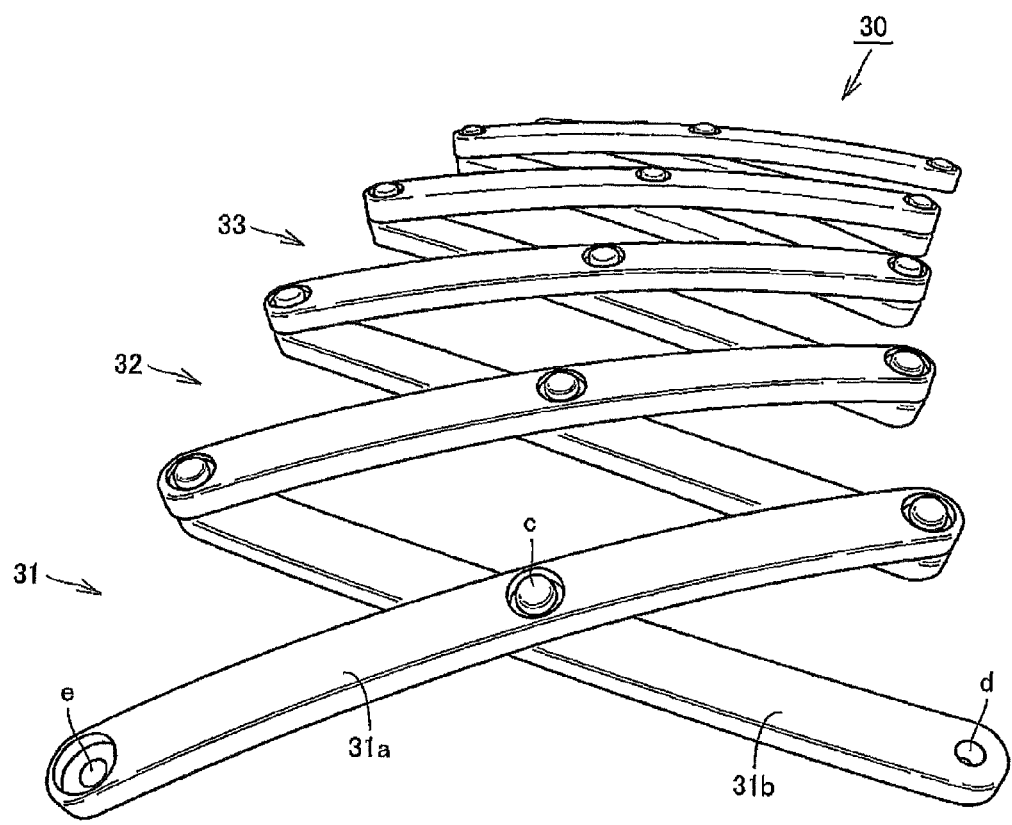
FIG. 13 is a perspective view of the extendable arm of the third embodiment which is in a slightly extended state.
Figure 14:
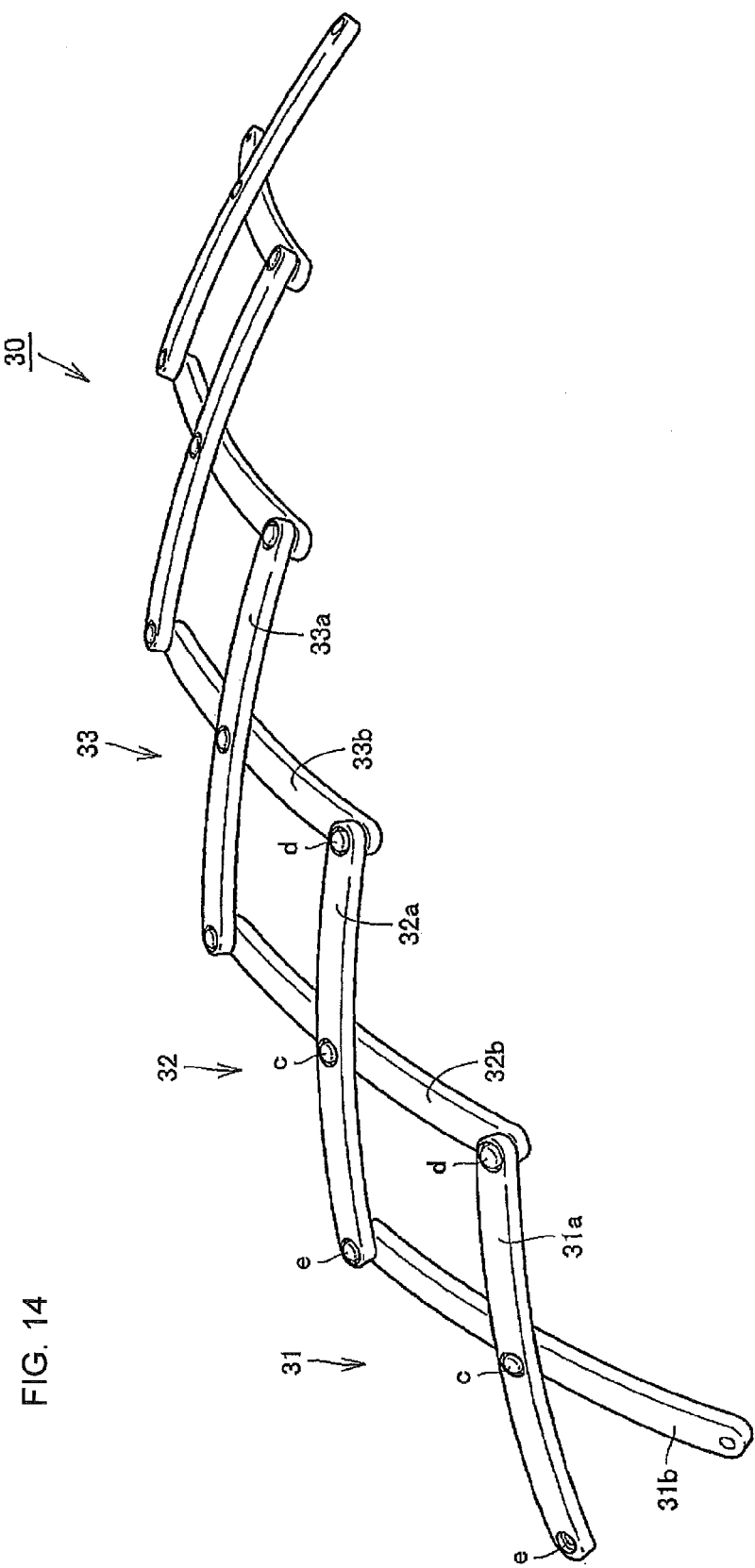
FIG. 14 is a perspective view of the extendable arm of the third embodiment which is in a relatively greatly extended state
Figure 15:
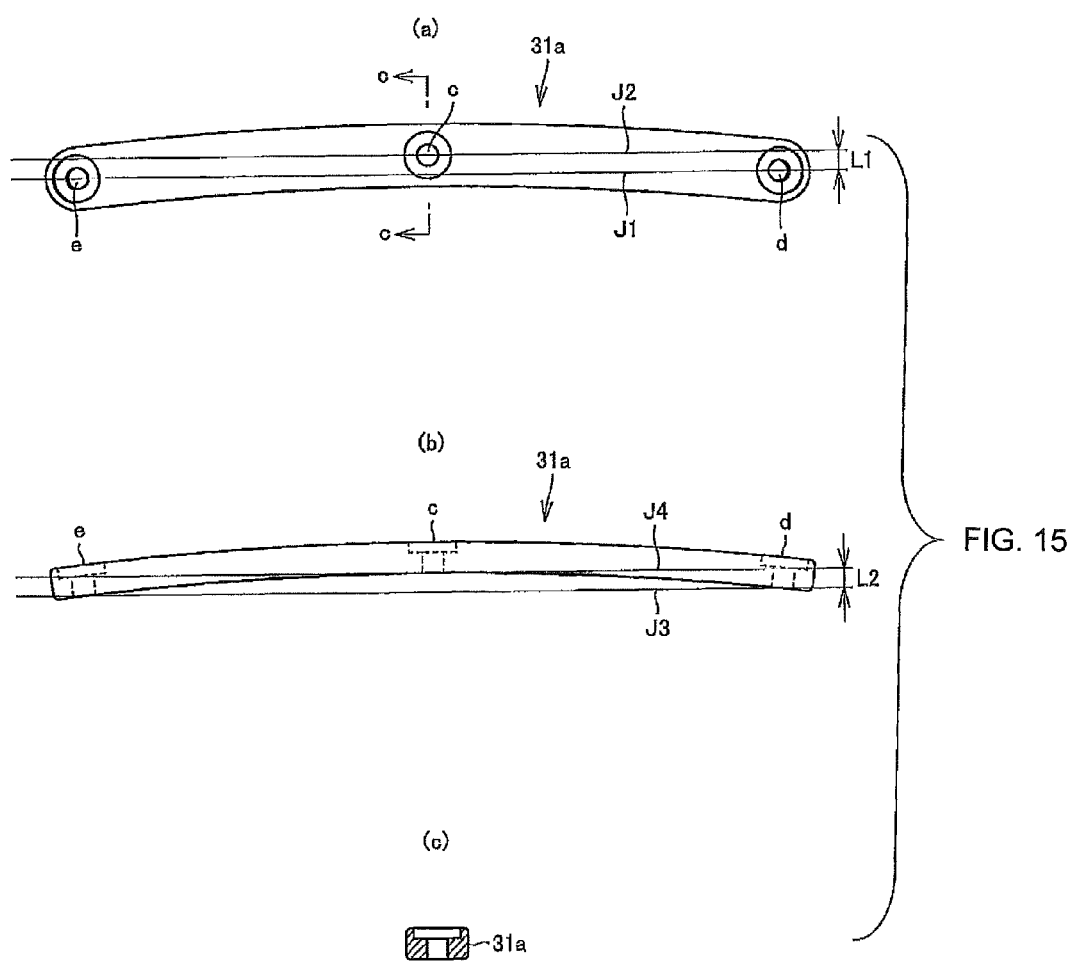
FIGS. 15(a) to 15(c) are diagrams showing a rigid member forming the extendable arm of the third embodiment, where

FIG. 13 shows the extendable arm 30 in a slightly extended state, and FIG. 14 shows the extendable arm 30 in a greatly extended state. As can be seen from these figures, the extendable arm 30 in the extended state has a curved shape that is convex in the lateral direction in its central portion as viewed from above, and has a curved shape that is convex upward in its central portion as viewed from the front. The extent to which the extendable arm is curved may be changed as appropriate and the overall length may also be changed as appropriate so that the extendable arm 30 substantially forms a part of a conical surface when in a deployed state.

<Fourth Embodiment>

Figure 20:
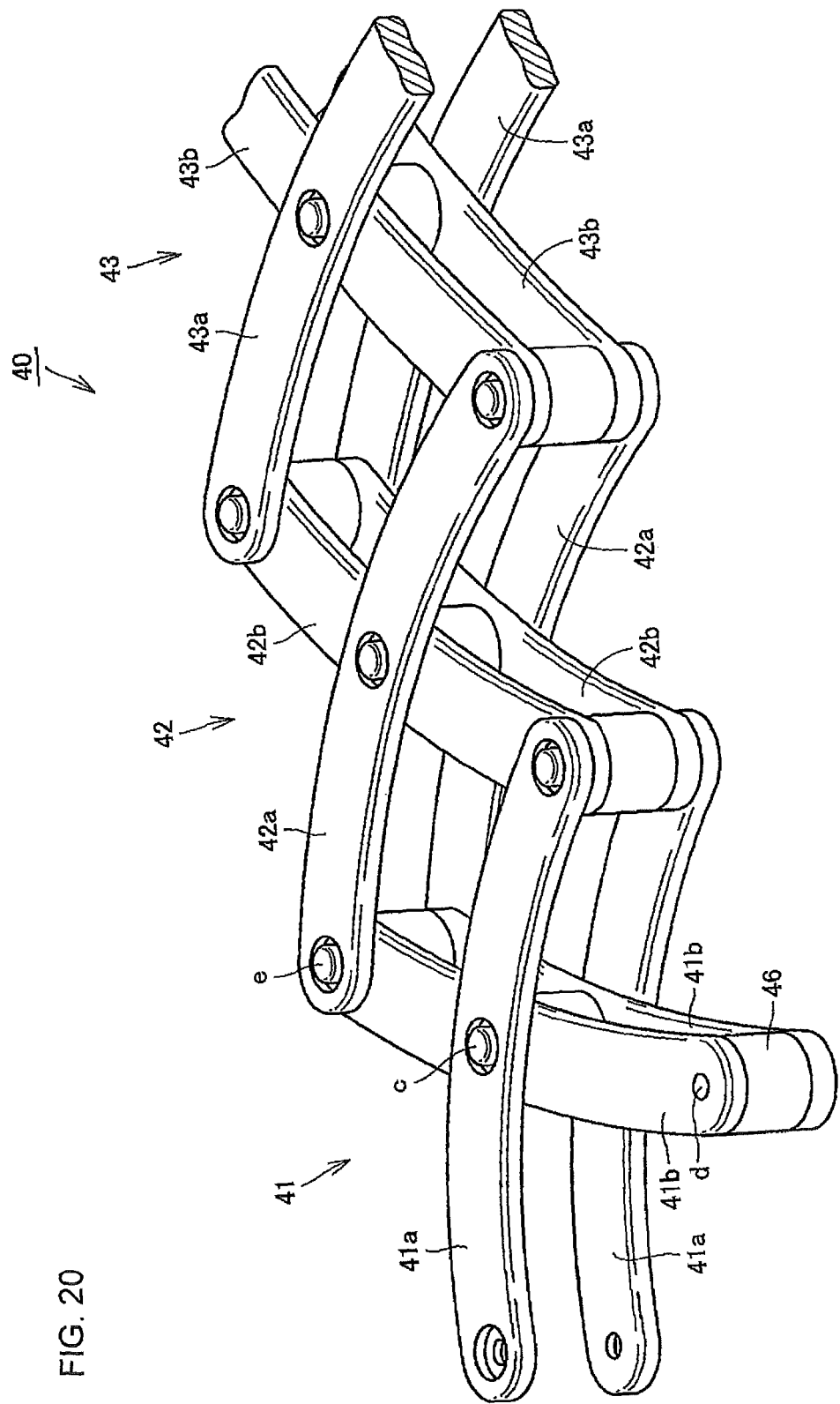
FIG. 20 is a perspective view of an extendable arm according to a fourth embodiment of the present invention.

FIG. 20 shows an extendable arm 40 according to a fourth embodiment of the present invention. Each rigid member 41a, 41b forming cross units 41 of the extendable arm 40 is shaped so as not to be curved in the thickness direction but to be curved only in the lateral direction. The extendable arm 40 of the present embodiment has a structure in which a pair of cross units 41 having the same structure are placed at an interval in the thickness direction and spacers 46 are placed therebetween to maintain the interval. The spacers 46 are located at the coupling points c, d, e.

<Fifth Embodiment>

Figure 21:
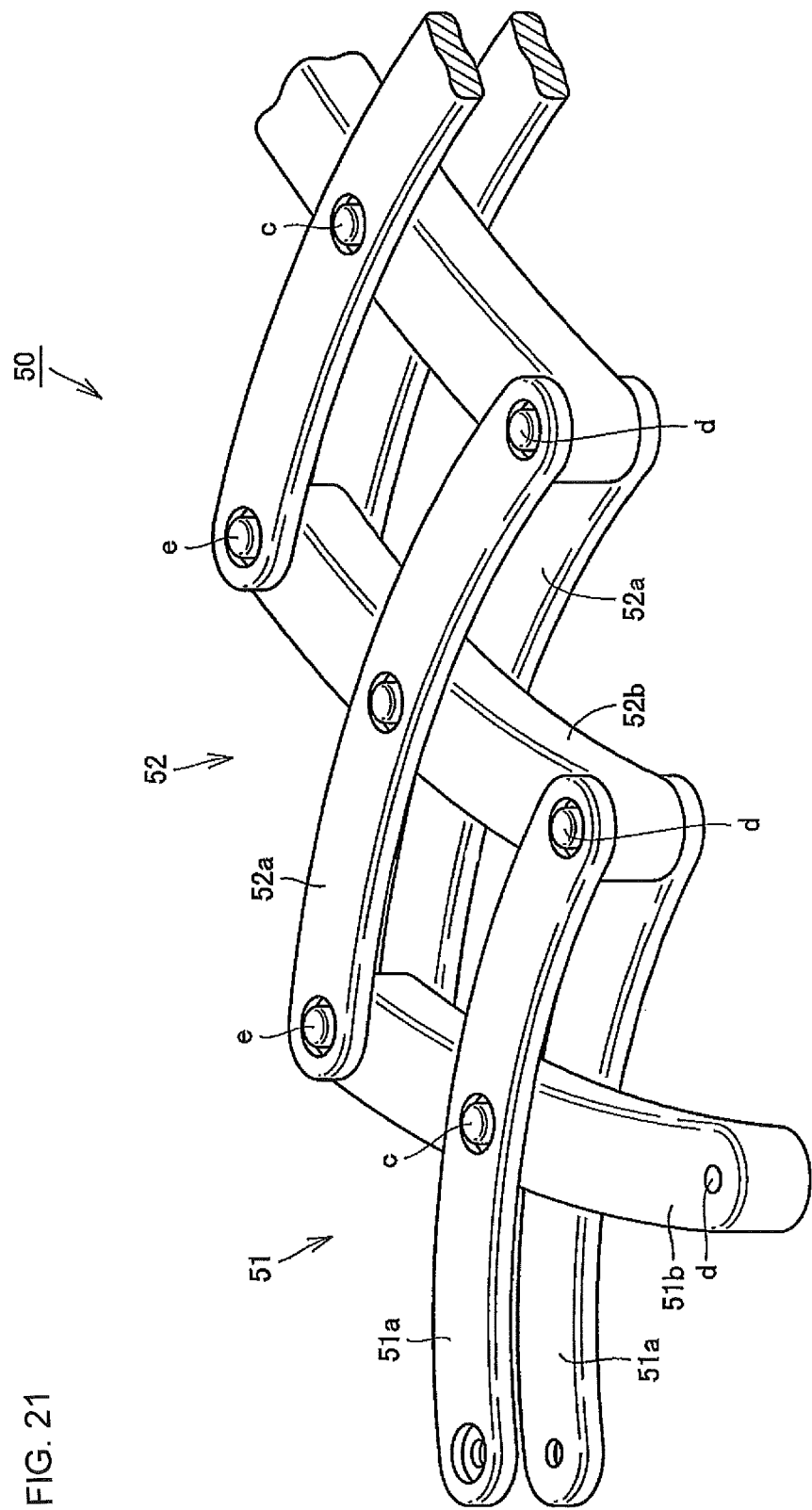
FIG. 21 is a perspective view of an extendable arm according to a fifth embodiment of the present invention.

FIG. 21 shows an extendable arm 50 according to a fifth embodiment of the present invention. Each rigid member 51a, 51b forming cross units 51 of the extendable arm 50 is shaped so as not to be curved in the thickness direction but to be curved only in the lateral direction. A pair of one rigid members 51a are provided at an interval in the thickness direction, and the other rigid member 51b is interposed between the pair of rigid members 51a and attached thereto.

The extendable arm 40 of FIG. 20 and the extendable arm 50 of FIG. 21 have higher strength because at least the one rigid members are provided in pairs.

The extendable arm may be designed to have any curved shape when in the extended state, such as an arc shape, a helical shape, or a wave shape, by devising the shape of each rigid member or combining as appropriate cross units formed by rigid members having different shapes. The extendable arm may be formed so that a three-dimensional shape formed by the extendable arm in a deployed state forms a part of a cylindrical surface, a part of a conical surface, or a part of a spherical surface. The extendable arm that is extended and contracted in a curved shape can be used in many applications.

<Other Embodiments>

Figure 22:
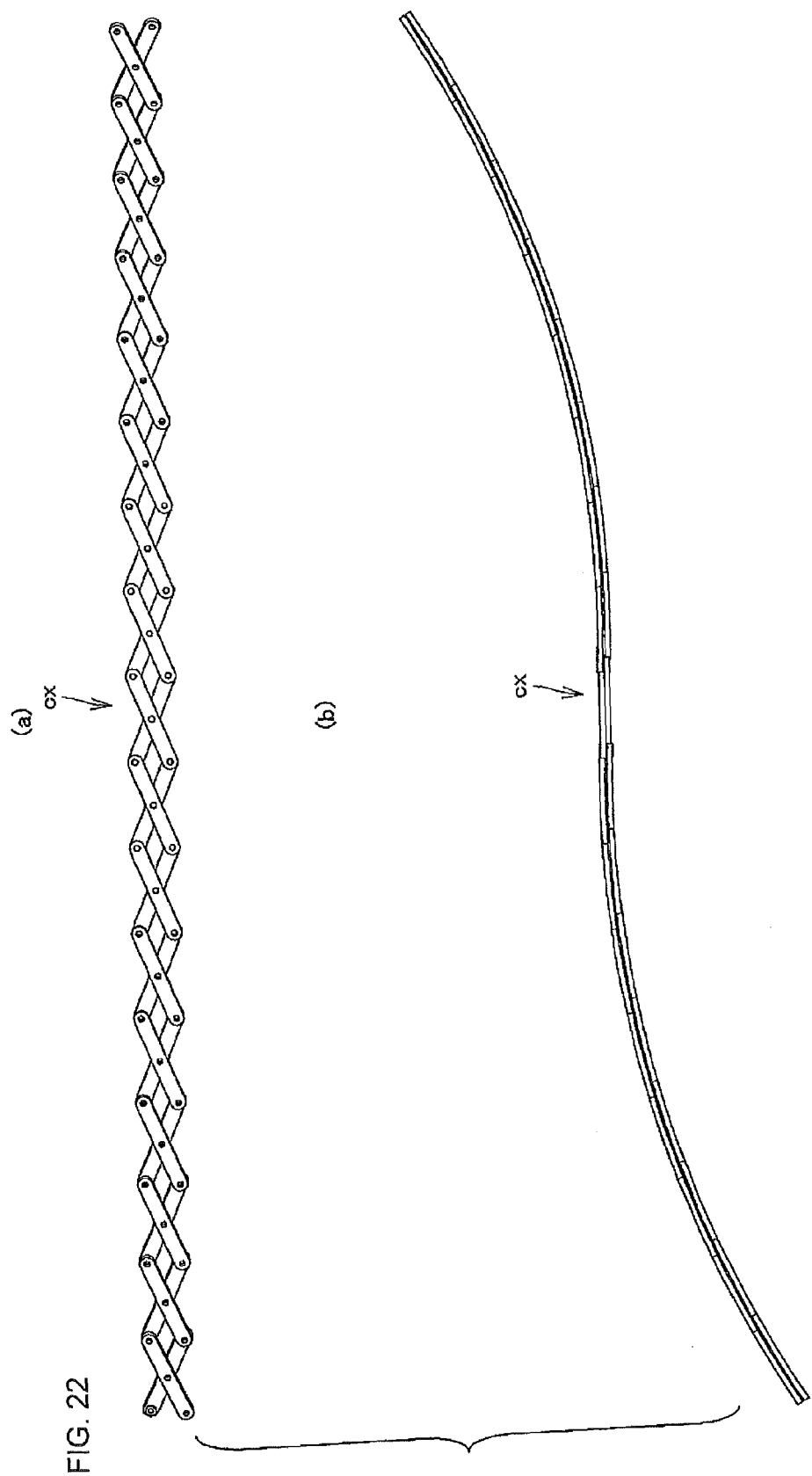
FIGS. 22(a) and 22(b) show an embodiment in which an extendable arm forms an S-shaped curved line, where

FIGS. 22(a) and 22(b) show an embodiment in which an extendable arm forms an S-shaped curved line when in a deployed state. FIG. 22(a) is a plan view, and FIG. 22(b) is a front view. As shown in the figures, every rigid member except those of a cross unit CX located at an intermediate position is slightly curved in the thickness direction. The rigid members of the cross unit CX located at the intermediate position are not curved. The rigid members of the cross units located on the left side of the intermediate position in the figure have a curved shape that is convex upward, and the rigid members of the cross units located on the right side of the intermediate position in the figure have a curved shape that is convex downward.

Figure 23:
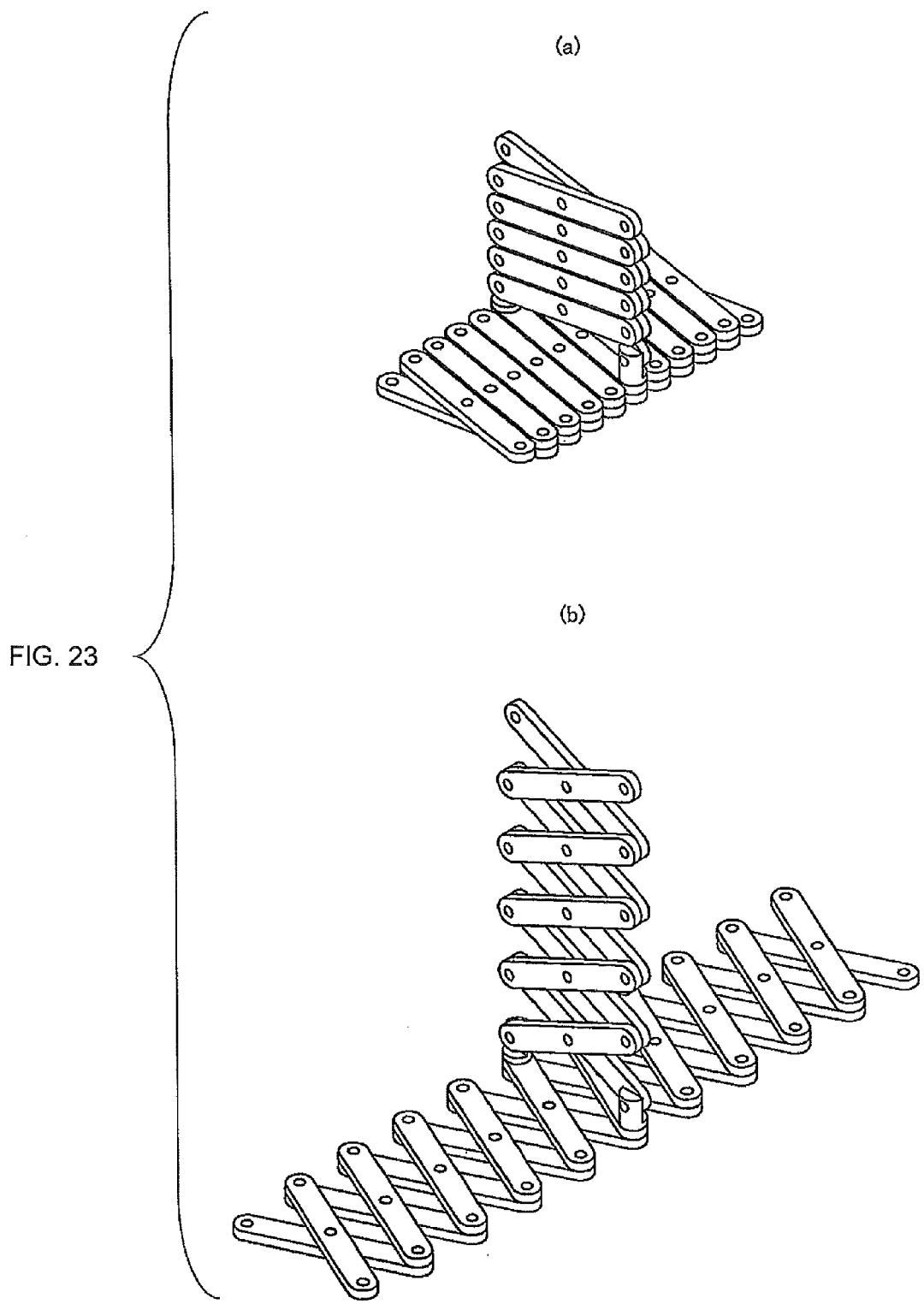
FIGS. 23(a) and 23(b) show an embodiment in which an extendable arm branches, where

FIGS. 23(a) and 23(b) show an embodiment in which an extendable arm branches at an intermediate position. FIG. 23(a) shows a contracted state, and FIG. 23(b) shows a slightly extended state. FIGS. 23(a) and 23(b) are shown in order to illustrate how the extendable arm branches, and each rigid member forming cross units is shown to have a non-curved shape for convenience of illustration. In the embodiment of the present invention, however, each rigid member is curved in the thickness direction or the lateral direction or in both directions.

In the embodiment shown in FIGS. 23(a) and 23(b), a vertically extending portion branches off from an intermediate position of a horizontally extending portion. Both ends of the cross unit located at an end of the vertically extending portion are coupled to both ends of the cross unit located at the intermediate position of the horizontally extending portion. Accordingly, when the horizontal portion of the extendable arm is extended from a contracted state, the vertical portion of the extendable arm is also shifted from a contracted state to an extended state accordingly.

The extendable arm may branch in the vertical direction at the horizontal portion, or may branch in the horizontal direction at the horizontal portion.

Figure 24:
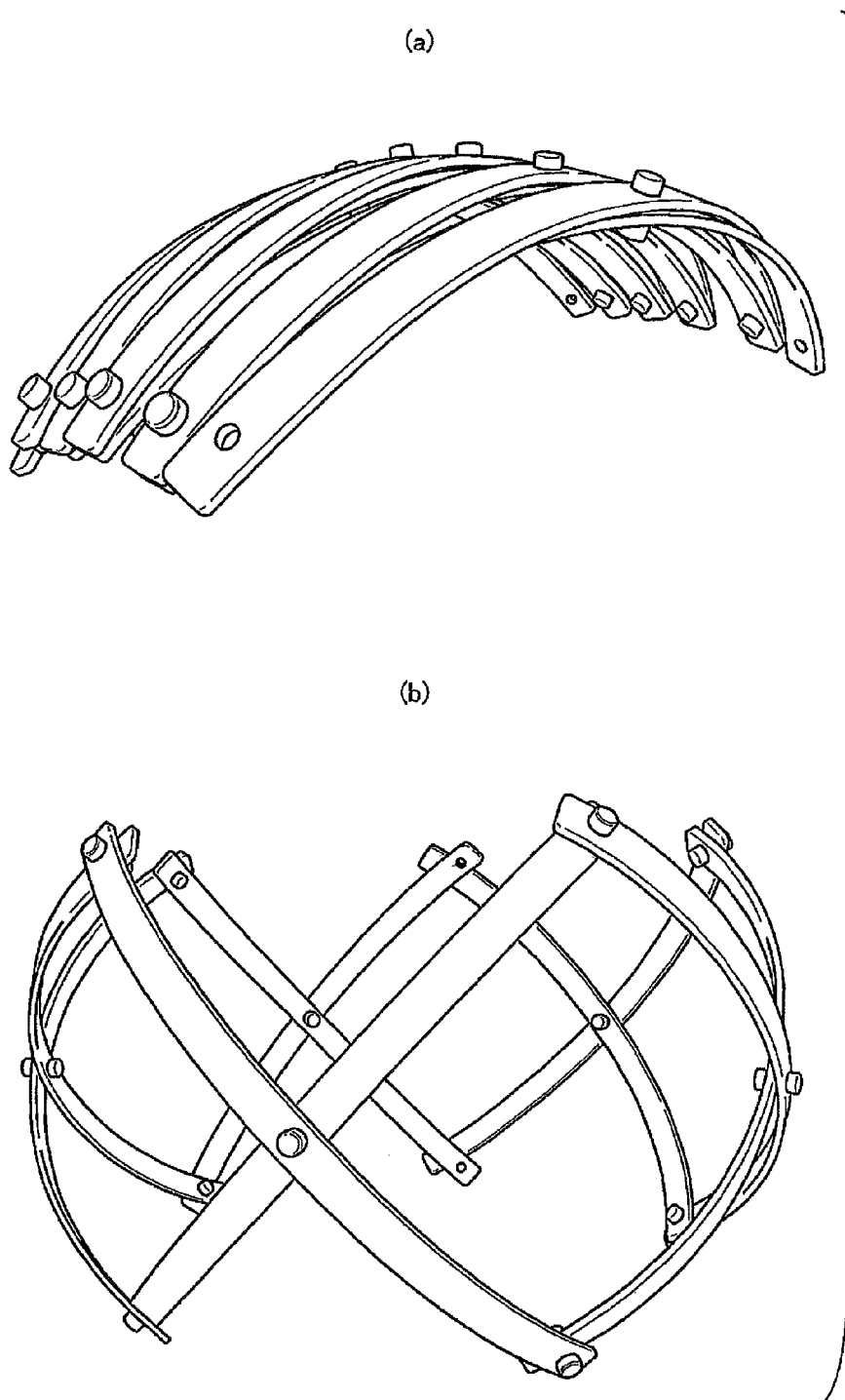
FIGS. 24(a) and 24(b) show an embodiment in which an extendable arm forms a part of a spherical surface when deployed, where
Figure 25:
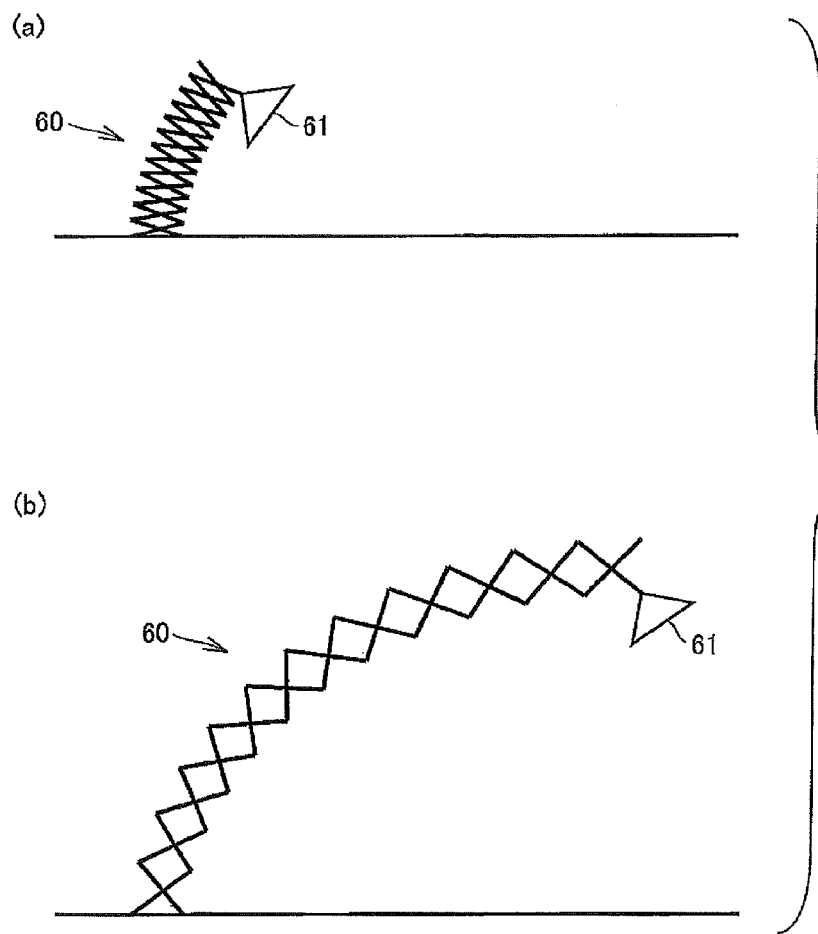
FIGS. 25(a) and 25(b) are illustrations showing an example of using an extendable arm for a desk lamp, where

FIGS. 24(a) and 24(b) show an embodiment in which each rigid member forming cross units is greatly curved in the thickness direction so as to form an arc shape. FIG. 24(a) shows a contracted state, and FIG. 24(b) shows an extended state. In the illustrated embodiment, since each rigid member is greatly curved in the thickness direction so as to form an arc shape, the extendable arm forms a part of a spherical surface when in a deployed state.

Figure 43:
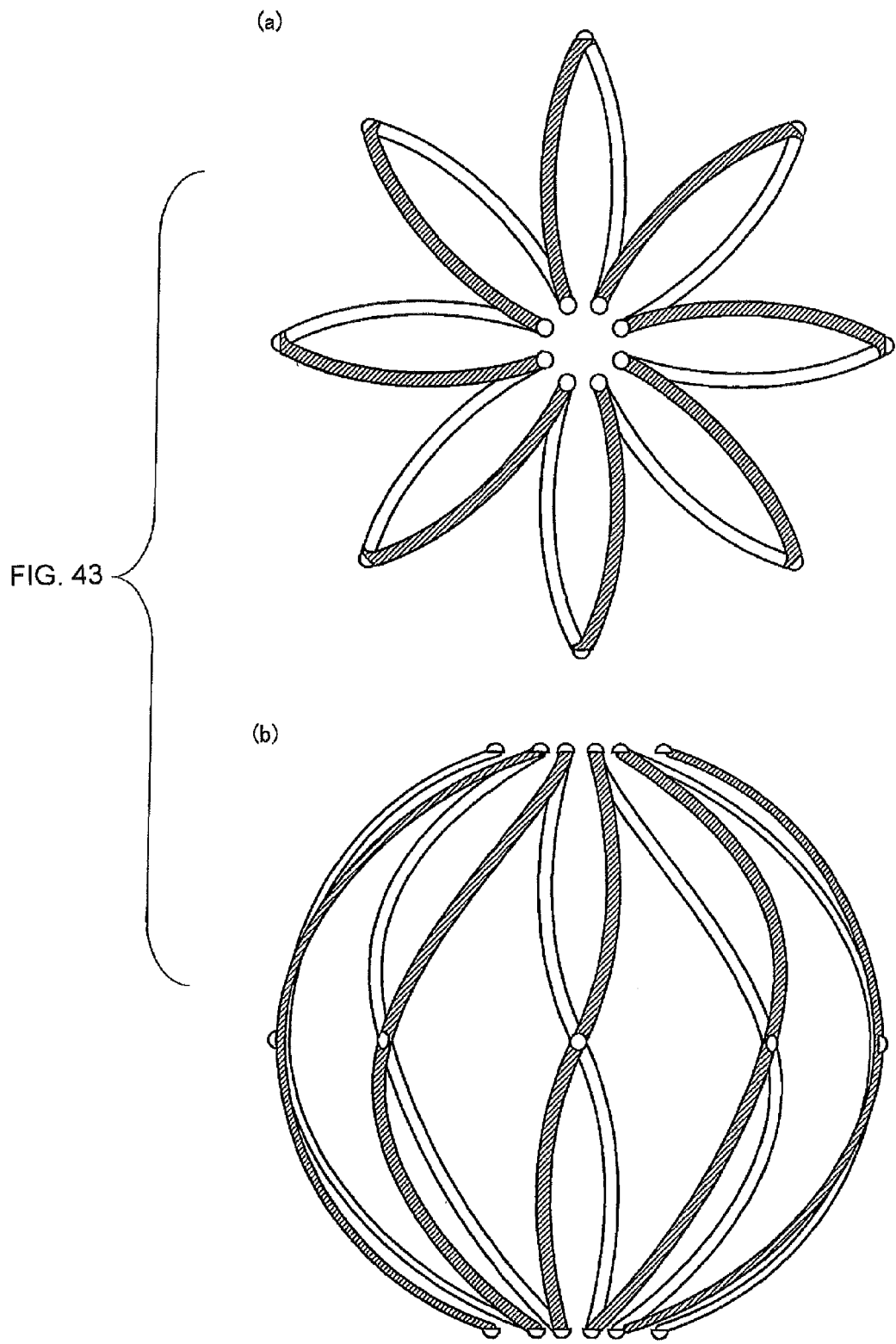
FIGS. 43(a) and 43(b) are diagrams showing an example in which an extendable arm forms a sphere.

As a modification of the embodiment shown in FIGS. 24(a) and 24(b), each rigid member may be more greatly curved in the thickness direction so as to form a semicircular arc with an included angle of 180 degrees. In this case, the extendable arm forms a spherical surface when in a deployed state. FIGS. 43(a) and 43(b) show an example in which the extendable arm forms a sphere. FIG. 43(a) is a plan view, and FIG. 43(b) is a front view. Each rigid member is greatly curved in the thickness direction so as to form a semicircular arc measuring about 180 degrees.

Figure 44:
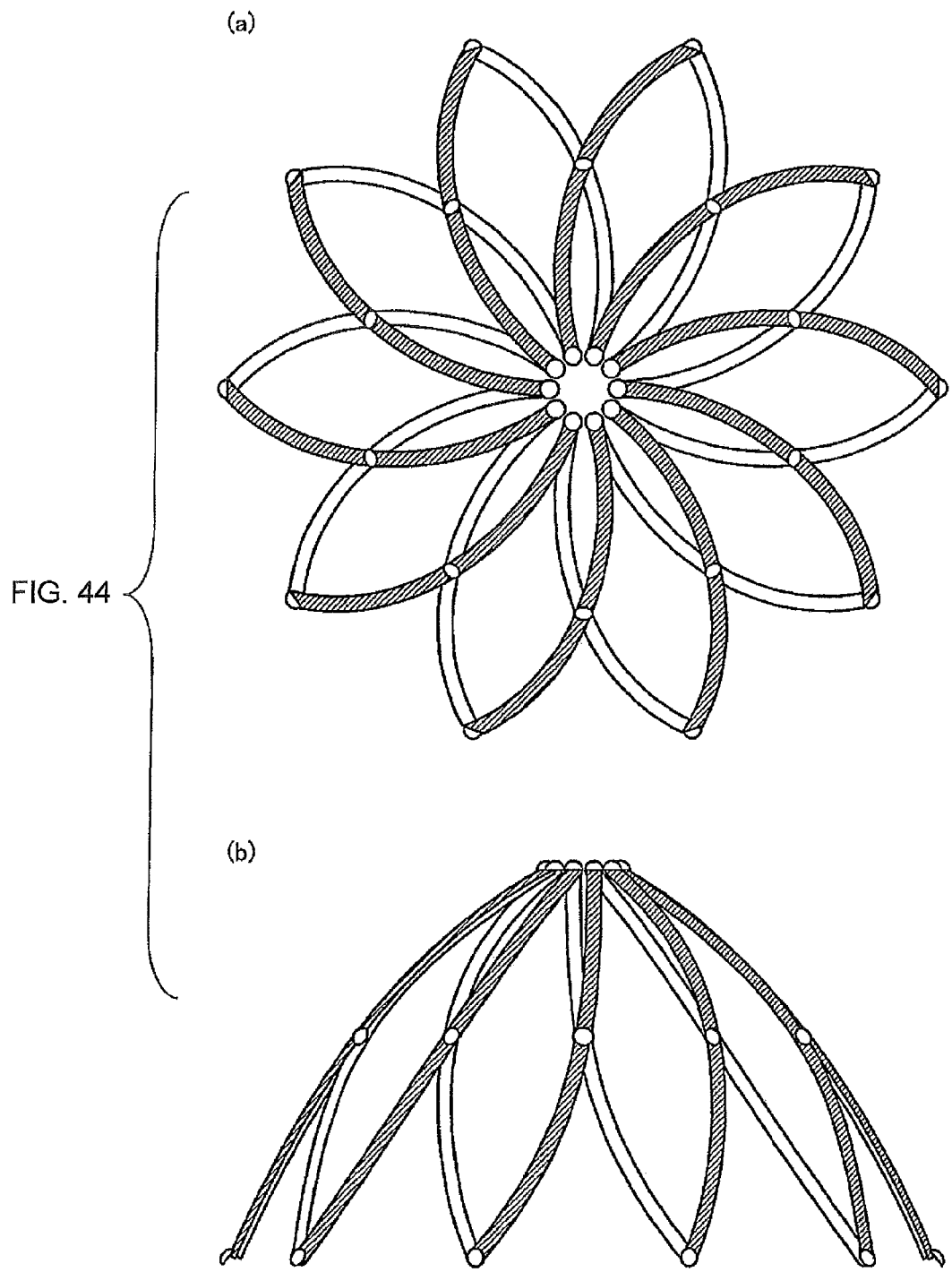
FIGS. 44(a) and 44(b) are diagrams showing an example in which an extendable arm forms a cone.

FIGS. 44(a) and 44(b) show an example in which the extendable arm forms a cone. FIG. 44(a) is a plan view, and FIG. 44(b) is a front view. Each rigid member is curved in both the thickness and lateral directions.

Although not shown in the figures, in order to form a helical shape with the extendable arm, each rigid member is curved in both the thickness and lateral directions, and one of each pair of rigid members is made longer than the other rigid member.

FIGS. 25 to 30 are illustrations showing examples of use of the extendable arm.

FIGS. 25(a) and 25(b) show an example of using an extendable arm 60 for a desk lamp. FIG. 25(a) shows the extendable arm 60 in a contracted state, and FIG. 25(b) shows the extendable arm 60 in an extended state. A lighting unit 61 is attached to the tip end of the extendable arm 60. For example, the extendable arm 60 is placed on a desk. As shown in FIGS. 22(a) and 22(b), the extendable arm 60 has a greatly curved shape when in the extended state. This can ensure a large work space under the extendable arm 60.

Figure 26:
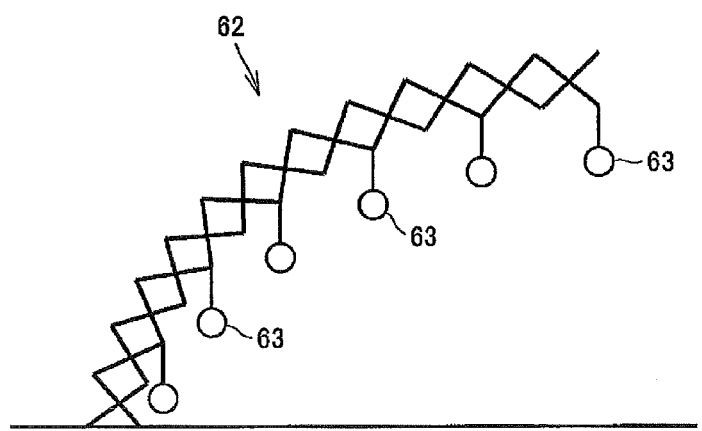
FIG. 26 is an illustration showing an example of using an extendable arm for a clothes hanger.

FIG. 26 shows an example of using an extendable arm 62 for a clothes hanger. The extendable arm 62 has a curved shape when in an extended state. Accordingly, attaching hangers or hooks 63 at different positions of the extendable arm 62 allows clothes etc. to be hung at various heights. A plurality of extendable arms with various shapes may be combined as appropriate in order to change the vertical heights of the plurality of attachment positions of the hangers or hooks or to shift the horizontal positions of the attachment positions of the hangers or hooks.

FIGS. 27(a) and 27(b) show an example of using an extendable arm 64 for a beverage tray on an armrest 65 of a seat. A beverage holder 66 is attached to the tip end of the extendable arm 64. As shown in FIG. 27(*a*), when the extendable arm 64 is in a contracted state, a large space is ensured in front of the seat. As shown in FIG. 27(*b*), when the extendable arm 64 is extended, the beverage holder 66 is located in front of a seated person.

Figure 29:
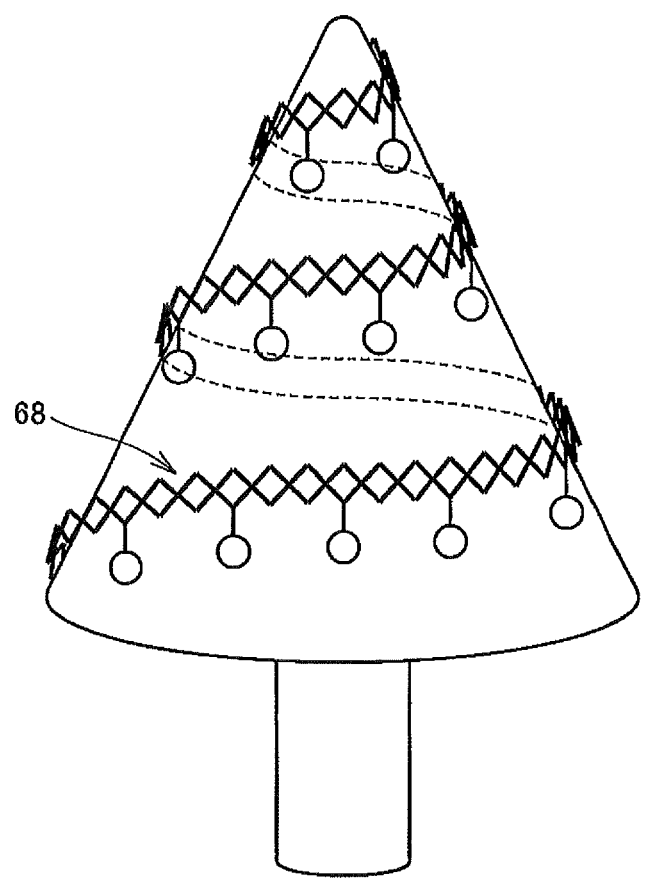
FIGS. 29 is a diagram showing an example of using an extendable arm for a decoration rail for a Christmas tree.

FIG. 28 shows an example of using an extendable arm 67 for an arched bridge. FIG. 29 shows an example of using an extendable arm 68 for a decoration rail for a Christmas tree.

Figure 30:
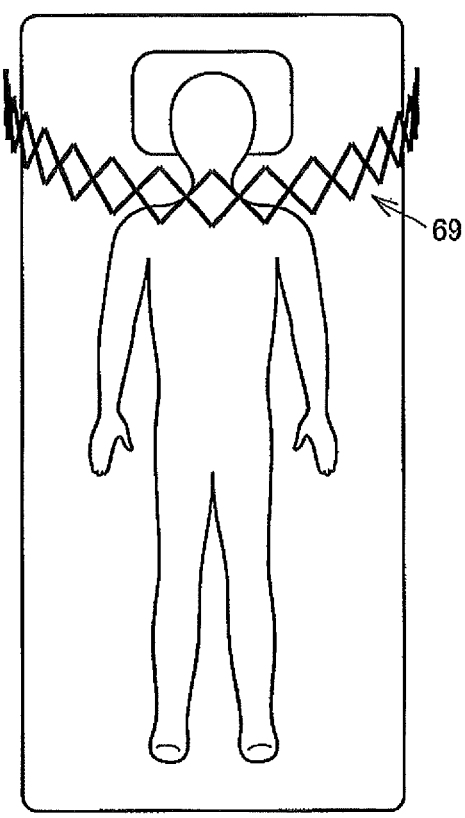
FIGS. 30(a) and 30(b) are illustrations showing an example of using an extendable arm for a visual object holding device that is placed on a bed, where
Figure 30:
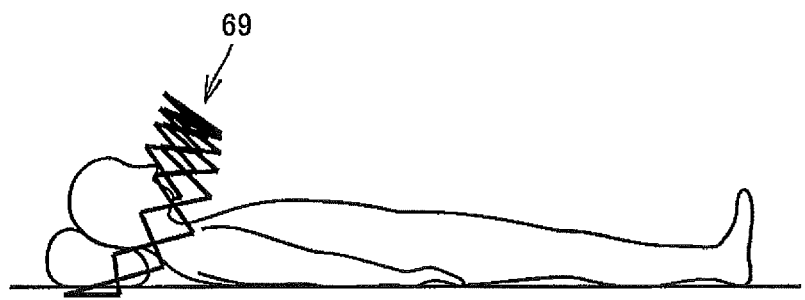

FIGS. 30(*a*) and 30(*b*) show an example of using an extendable arm 69 for a visual object holding device that is attached to a bed. When in an extended state, the extendable arm 69 has a greatly curved shape from the side of the bed to a position above the face of a person lying on the bed. Accordingly, attaching to the extendable arm 68 a holder for a visual object such as a book or an information display device allows the person to easily read and look at the visual object.

<Examples of Partition>

Figure 31:
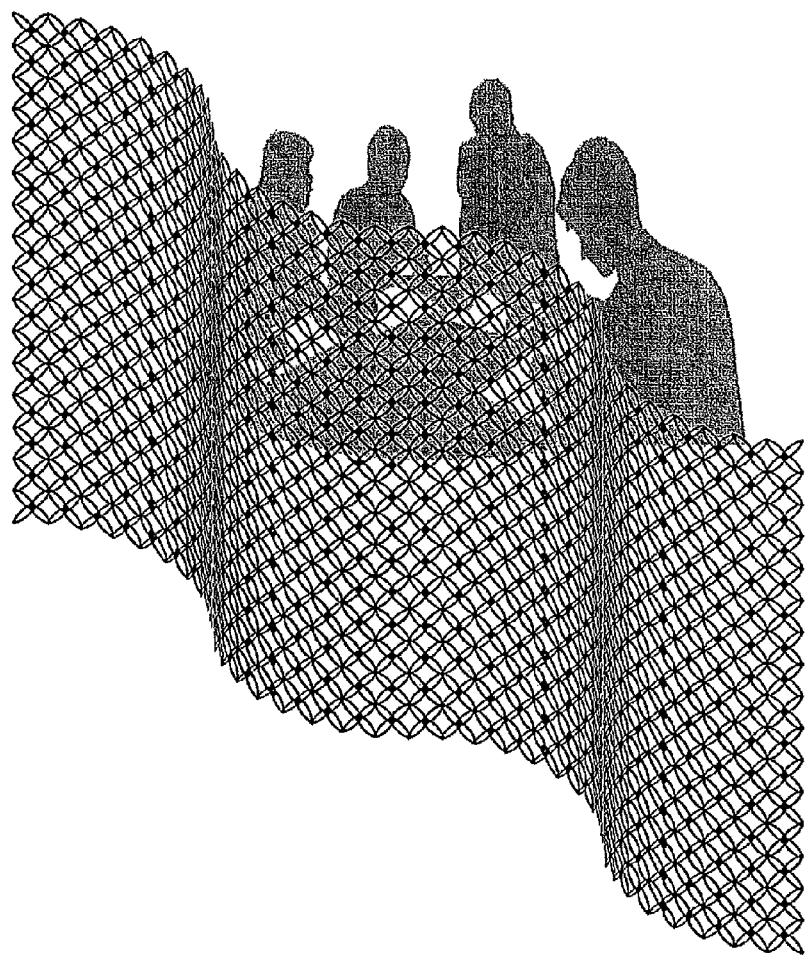
FIG. 31 is a diagram showing an example of a partition.

As described above, the extendable arm can be designed to have any curved shape when in the extended state, such as an arc shape, a helical shape, or a wave shape, by devising the shape of each rigid member or combining as appropriate cross units formed by rigid members having different shapes. FIG. 31 shows an example of a partition, in which a plurality of extendable arms are coupled in the lateral direction crossing the longitudinal direction so that the partition extends in the vertical and horizontal directions and has a large area. The illustrated partition has a wave-like curved shape for improved design.

Figure 32:
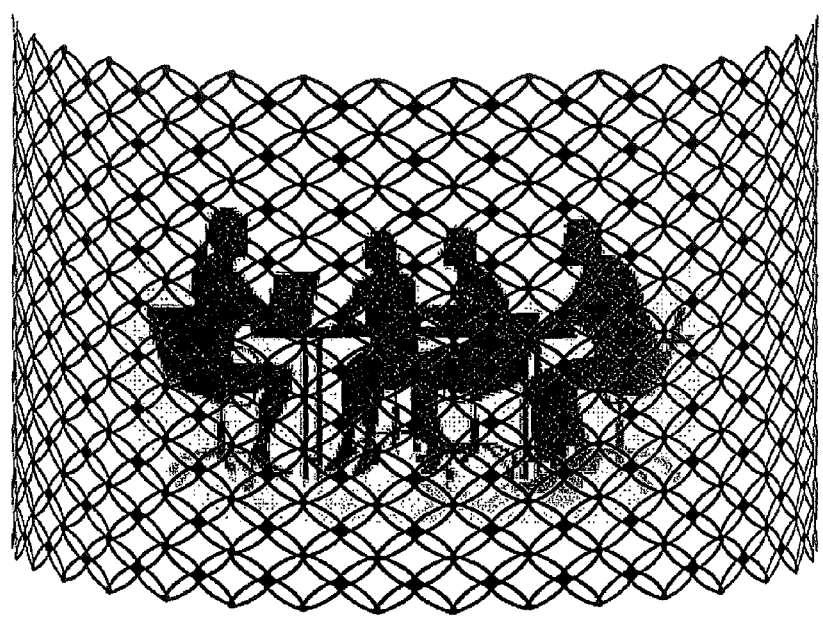
FIG. 32 is a diagram showing another example of the partition.
Figure 33:
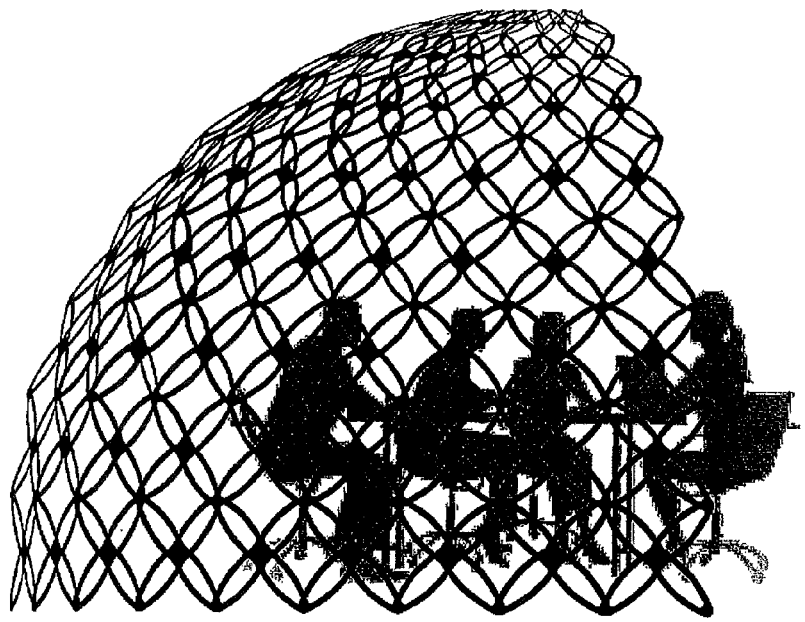
FIG. 33 is a diagram showing still another example of the partition.

FIG. 32 shows an example of a partition in the form of a cylindrical surface, and FIG. 33 shows an example of a partition in the form of a spherical surface. As shown in FIGS. 31 to 33, a partition in any form can be produced by devising the shape of the rigid members as appropriate.

<Examples of Desk Lamp>

Figure 34:
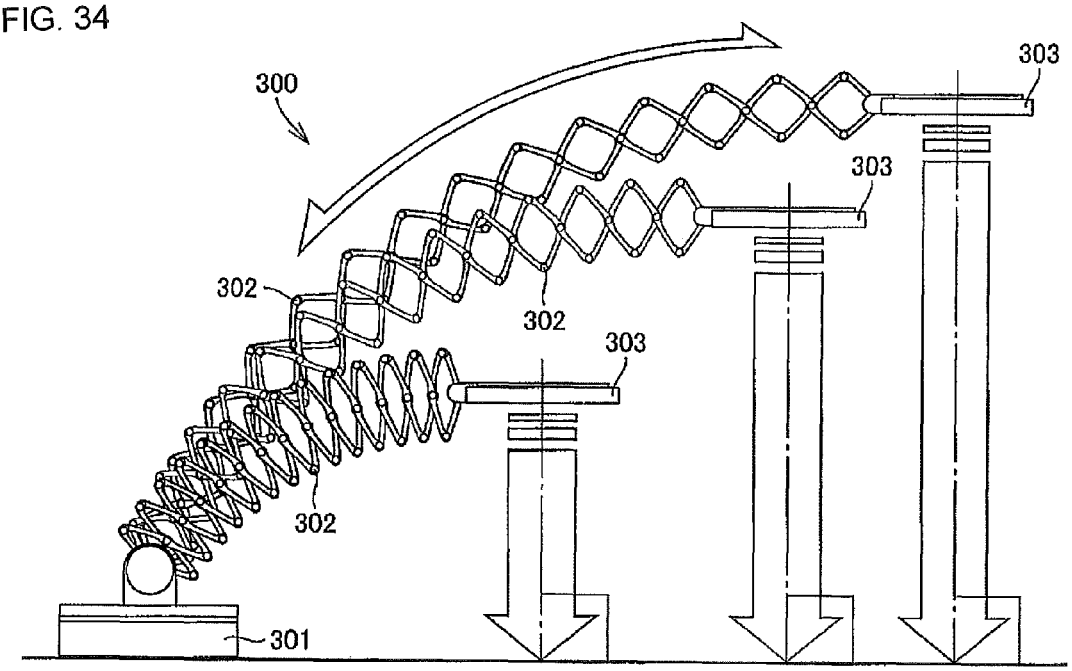
FIG. 34 is a diagram showing an example of a desk lamp.

FIG. 34 shows an example of a desk lamp using an extendable arm according to an embodiment of the present invention. A desk lamp 300 includes an extendable arm 302 according to an embodiment of the present invention, a base member 301 supporting the base end of the extendable arm 302 and containing a power supply control unit, a lighting unit 303 attached to the tip end of the extendable arm 302, and an electrical cord (not shown) extending from the base member 301 to the lighting unit 303.

In the extendable arm 302 of the desk lamp 300 shown in FIG. 34, the coupling points at both ends of each rigid member forming cross units are shifted in the lateral direction of the rigid member, and the direction in which the lighting unit 303 emits light is the same regardless of whether the extendable arm 302 is in an extended state or in a contracted state.

FIG. 34 shows three states of the extendable arm 302, namely a contracted state, an intermediate state, and an extended state, in an overlapping manner. The lighting unit 303 always emits light in a direction perpendicular to the surface of a desk regardless of the position of the extendable arm 302.

Figure 35:
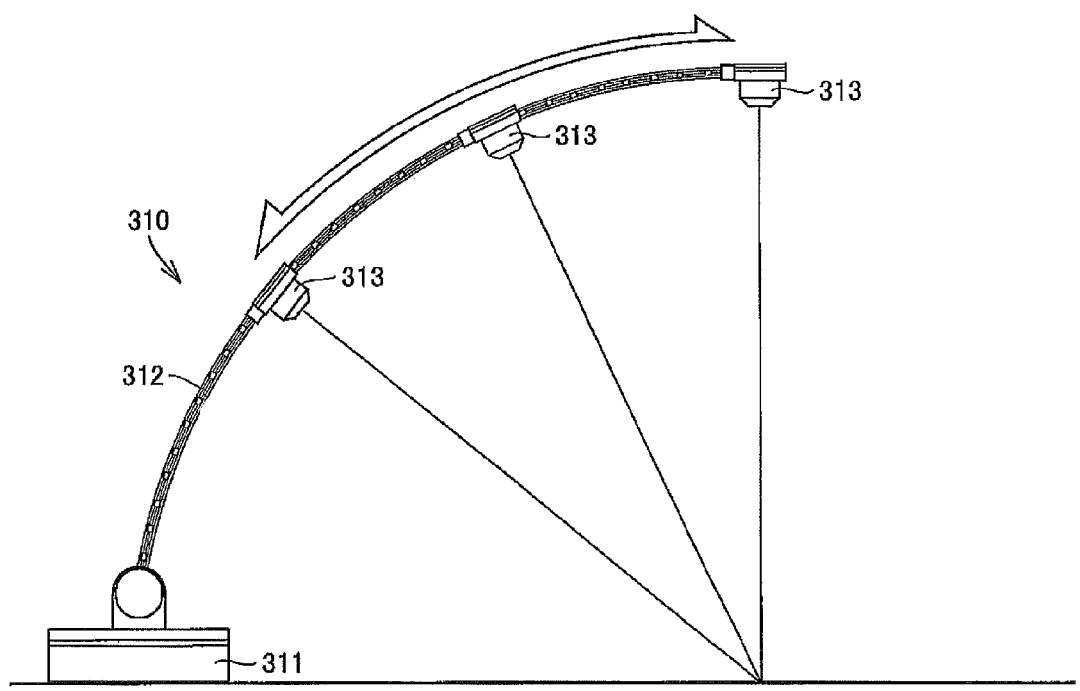
FIG. 35 is a diagram showing another example of the desk lamp.

FIG. 35 shows another example of the desk lamp using an extendable arm according to another embodiment of the present invention. A desk lamp 310 includes an extendable arm 312, a base member 311 supporting the base end of the extendable arm 312 and containing a power supply control unit, a lighting unit 313 attached to the tip end of the extendable arm 312, and an electrical cord (not shown) extending from the base member 311 to the lighting unit 313. In the extendable arm 312 of the desk lamp 310 shown in FIG. 35, the coupling points at both ends of each rigid member forming cross units are shifted in the thickness direction of the rigid member. In this case, the radius of curvature of the extendable arm 312 is the same regardless of whether the extendable arm 312 is in an extended state or in a contracted state. The lighting unit 313 therefore emits light to the same position on a desk regardless of whether the extendable arm 312 is in the extended state or in the contracted state.

Although FIG. 35 shows an example of the desk lamp, the present invention may be applied to a laser radiation device by using a similar configuration.

Figure 36:
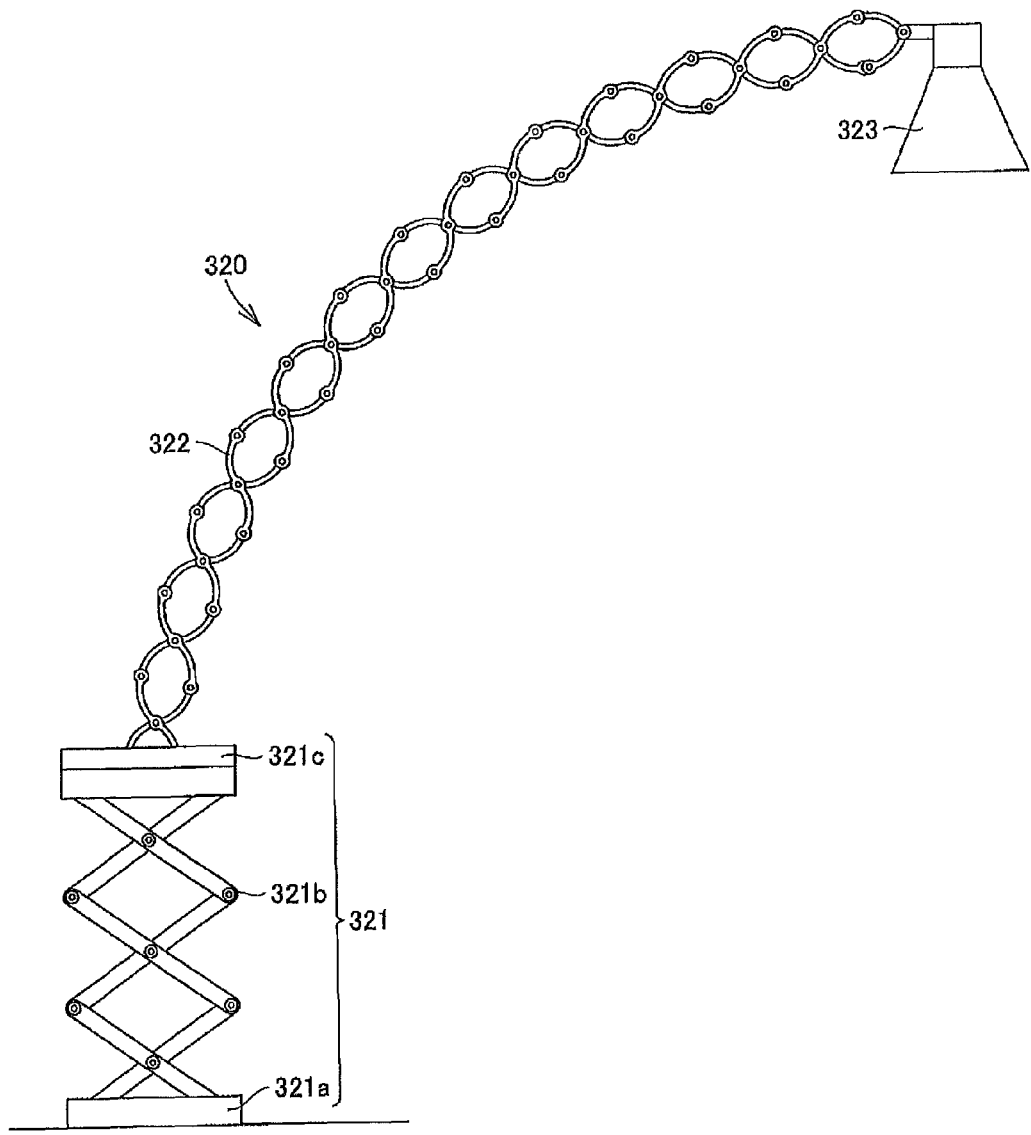
FIG. 36 is a diagram showing still another example of the desk lamp.

FIG. 36 shows still another example of the desk lamp. An illustrated desk lamp 320 includes a base unit 321, an extendable arm 322 according to an embodiment of the present invention, which has its base end supported by the base unit 321, and a lighting unit 323 attached to the tip end of the extendable arm 322. The coupling points at both ends of each rigid member forming the extendable arm 322 are shifted in the lateral direction of the rigid member. The direction in which the lighting unit 323 emits light is the same regardless of whether the extendable arm 322 is in an extended state or in a contracted state.

The base unit 321 of the desk lamp shown in FIG. 36 includes a base member 321*a* that is placed directly on a desk, an upper plate 321*c* that directly supports the base end of the extendable arm 322, and an extendable arm 321*b* that couples the base member 321*a* and the upper plate 321*c*. The extendable arm 321*b* has a conventional structure. A cross unit is formed by two linear plate members that are crossed over each other at their centers to form an X-shape. Such cross units are coupled in the vertical direction so that the extendable arm 321*b* can be linearly extended and contracted in the vertical direction.

In the case of the desk lamp shown in FIG. 36, the extendable arm 322 and the lighting unit 323 can be translated in the vertical direction by extending and contracting the extendable arm 321*b*. In the case of coupling a pair of rigid members located at an end in the longitudinal direction of the extendable arm to the plate member, the plate member supports the pair of rigid members in such a state that shifting of the rigid members is permitted, so that a change in interval between the pair of rigid members is permitted.

Preferably, in the desk lamp using the extendable arm according to the embodiment of the present invention, the electrical cord that couples the base member and the lighting unit is configured to extend through the extendable arm within the range of the thickness of the extendable arm. Various structures can be used to implement this configuration. For example, in the extendable arm having the shape shown in FIG. 20, there is clearance between the upper and lower cross units. Accordingly, the electrical cord is placed to extend through the clearance. In another structure, a recess or hole may be formed in the rigid members so that the electrical cord extends therethrough.

<Examples of Bed Structure with Extendable Arm>

Figure 37:
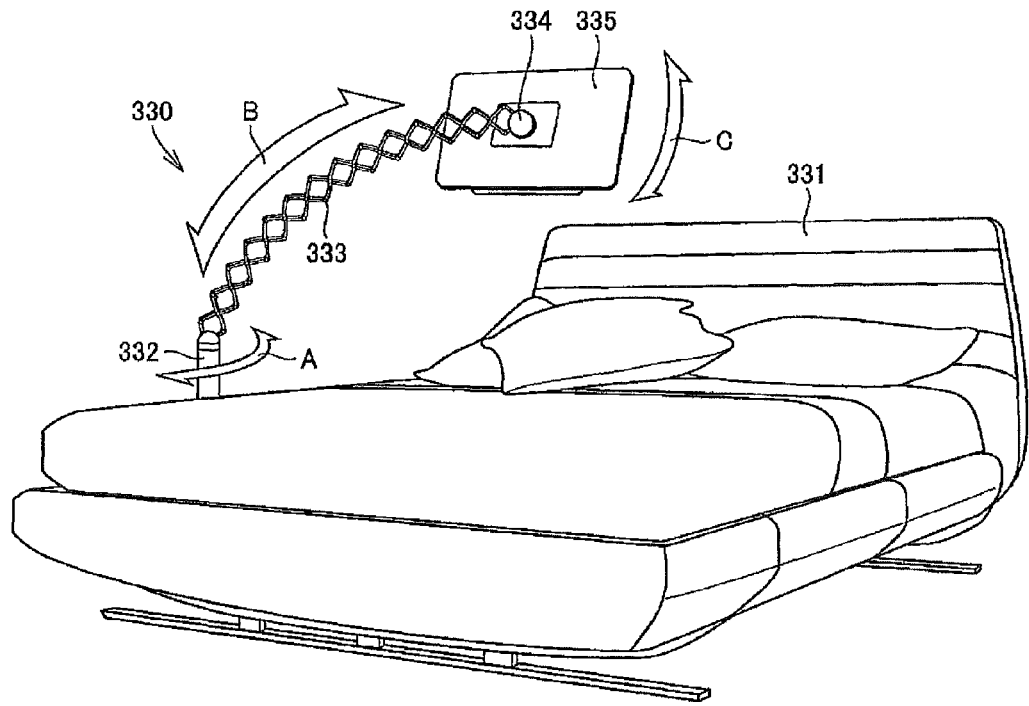
FIG. 37 is a diagram showing an example of a bed structure with an extendable arm.

FIG. 37 shows an example of a bed structure with an extendable arm, which uses an extendable arm according to an embodiment of the present invention. A structure 330 shown in FIG. 37 includes a bed 331, a base member 332 fixed to the bed 331, and an extendable arm 333 having its base end supported by the base member 332 and having an article holding unit 334 at its tip end. As shown in the figure, the article holding unit 334 holds a visual object 335 such as a touch panel display or a television display.

Preferably, the base end of the extendable arm 333 is rotatable about the longitudinal axis of the cylindrical base member 332, as shown by arrow A. Preferably, the article holding unit 334 rotatably holds the display 335 as shown by arrow C so that a person lying on the bed can change the angle of the visual object 335 as necessary.

The extendable arm 333 can be extended and contracted as shown by arrow B. The extendable arm 333 is formed by a plurality of cross units arranged in one direction and pivotally coupled to each other, and each of the cross units is formed by two rigid members that are pivotally coupled at the central coupling point so as to cross over each other to form an X-shape. In order for the extendable arm to follow a curved-line path when being extended and contracted, each rigid member has such a curved shape that the coupling points at both ends thereof are shifted toward one side from a longitudinal axis passing through the central coupling point.

Preferably, the coupling points at both ends of each rigid member are shifted in the thickness direction of the rigid member. Accordingly, the visual object 335 held by the article holding unit 334 can always provide a visual surface facing toward the face of the person lying on the bed, regardless of whether the extendable arm 333 is in the extended state or in the contracted state.

Figure 38:
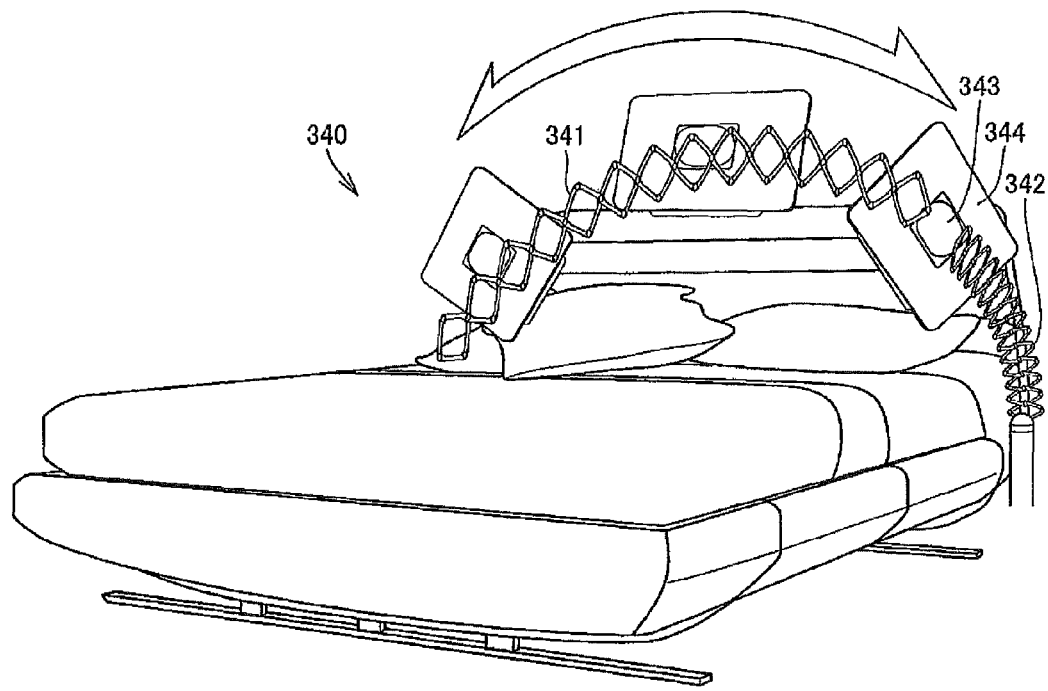
FIG. 38 is a diagram showing another example of the bed structure with the extendable arm.

FIG. 38 shows another example of the bed structure with the extendable arm. In a bed structure 340 with an extendable arm shown in the figure, a first extendable arm 341 extends from one side of the bed, and a second extendable arm 342 extends from the other side of the bed. The tip end of the first extendable arm 341 and the tip end of the second extendable arm 342 are coupled to a common article holding unit 343. The article holding unit 343 holds a visual object 344. According to the present embodiment, the visual object 344 can be moved in a wide range from one side to the other side of the bed.

<Examples of Article Holding Device>

Figure 39:
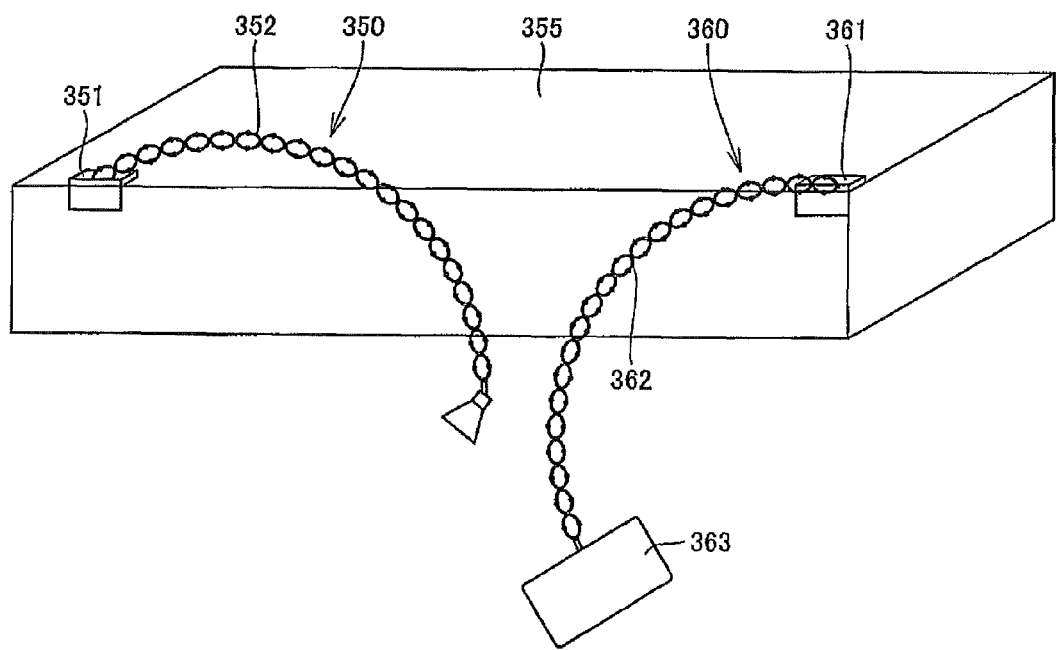
FIG. 39 is a diagram showing two examples of an article holding device.

FIG. 39 shows two examples of an article holding device. One article holding device 350 holds a lighting unit 353, and the other article holding device 360 holds a touch panel display 363. The one article holding device 350 includes a base member 351 fixed to a piece of furniture 355 such as a bookshelf, and an extendable arm 352 having its base end supported by the base member 351 and holding the lighting unit 353 at its tip end. The other article holding device 360 includes a base member 361 fixed to the piece of furniture 355 such as a bookshelf, and an extendable arm 362 having its base end supported by the base member 361 and holding the touch panel display 363 at its tip end.

Figure 40:
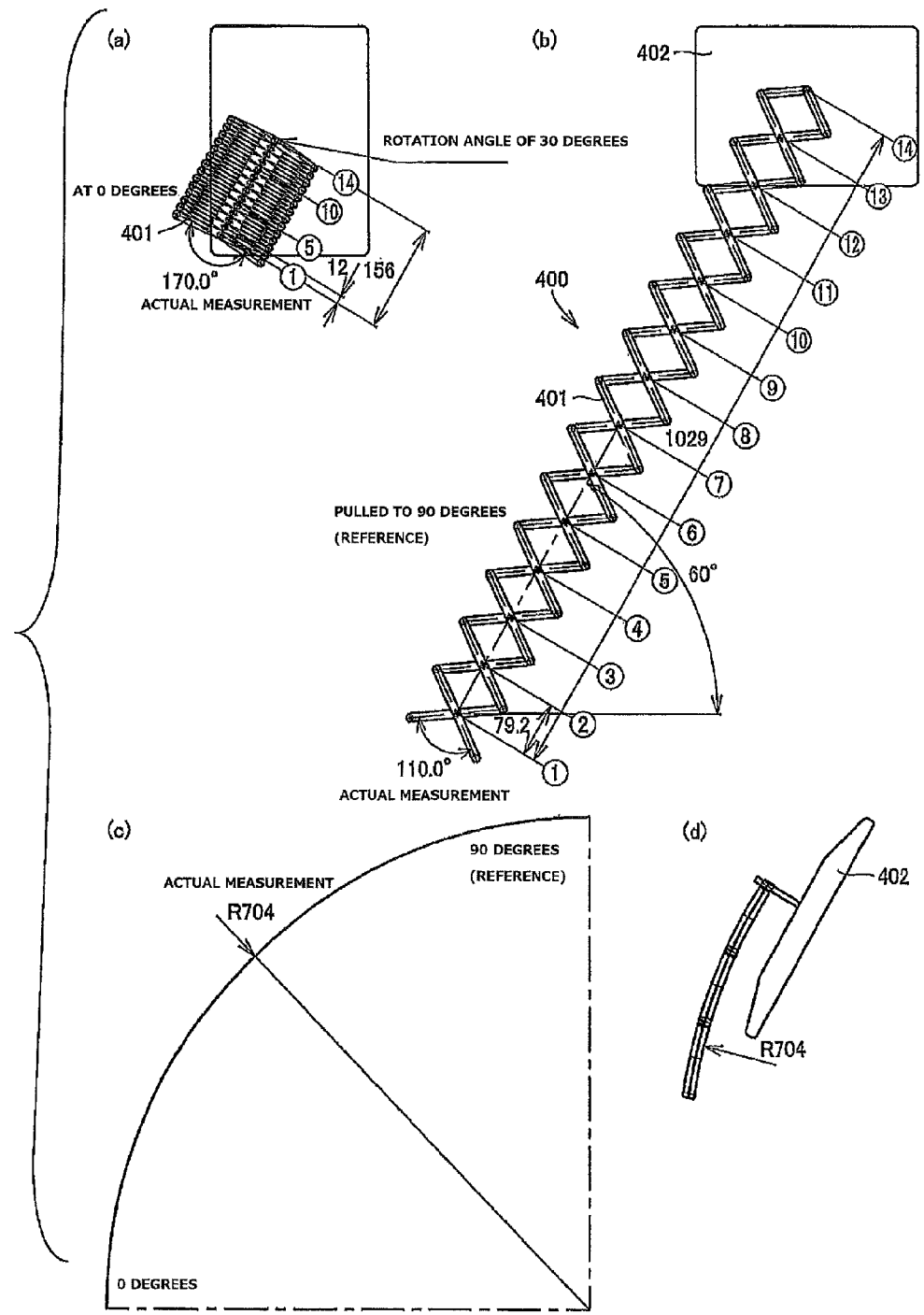
FIGS. 40(a) to 40(d) are diagrams showing still another example of the article holding device.

FIGS. 40(*a*) to 40(*d*) show an example of a television display holding device 400 using an extendable arm 401 including 13 cross links. Specific dimensions are shown in the figures by way of example. As shown in FIG. 40(*d*), a television display 402 is attached to the tip end of the extendable arm 401. In the illustrated extendable arm 401, the coupling points at both ends of each rigid member are shifted in the thickness direction of the rigid member. Accordingly, the radius of curvature of the extendable arm 401 is the same regardless of whether the extendable arm 401 is in an extended state or in a contracted state.

As shown in FIG. 40(*a*), the extendable arm 401 has a length of 156 mm when in the most contracted state. FIGS. 40(*b*) and 40(*c*) show the extendable arm 401 extended to such an extent that the television display 402 is located at the highest position (angle of 90 degrees). The radius of curvature of the extendable arm 401 is 704 mm, and the interval between adjoining ones of the cross links is 79.2 mm. The angle between a pair of rigid members forming a single cross link is 110.0°.

Figure 41:
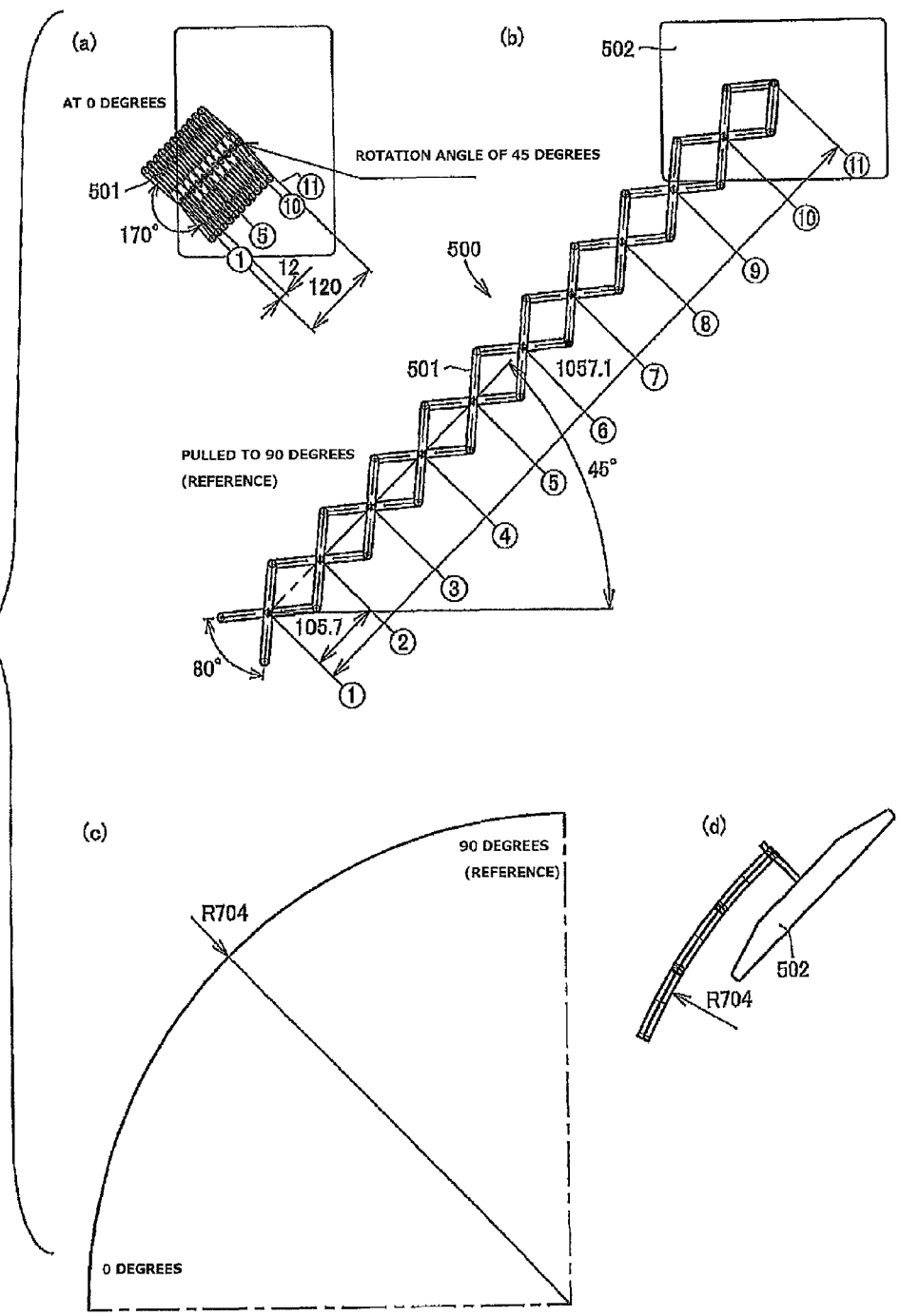
FIGS. 41(a) to 41(d) are diagrams showing a further example of the article holding device.

FIGS. 41(*a*) to 41(*d*) show a television display holding device 500 that supports a television display 502 by an extendable arm 501 including 10 cross links. In the extendable arm 501, the coupling points at both ends of each rigid member are shifted in the thickness direction of the rigid member. Accordingly, the radius of curvature of the extendable arm 501 is the same regardless of whether the extendable arm 501 is in an extended state or in a contracted state.

As shown in FIG. 41(*a*), the extendable arm 501 has a length of 120 mm when in the most contracted state. FIGS. 41(*b*) and 41(*c*) show the extendable arm 501 extended to such an extent that the television display 502 is located at the highest position (angle of 90 degrees). The radius of curvature of the extendable arm 501 is 704 mm, and the interval between adjoining ones of the cross links is 105.7 mm. The angle between a pair of rigid members forming a single cross link is 80.0°.

Figure 45:
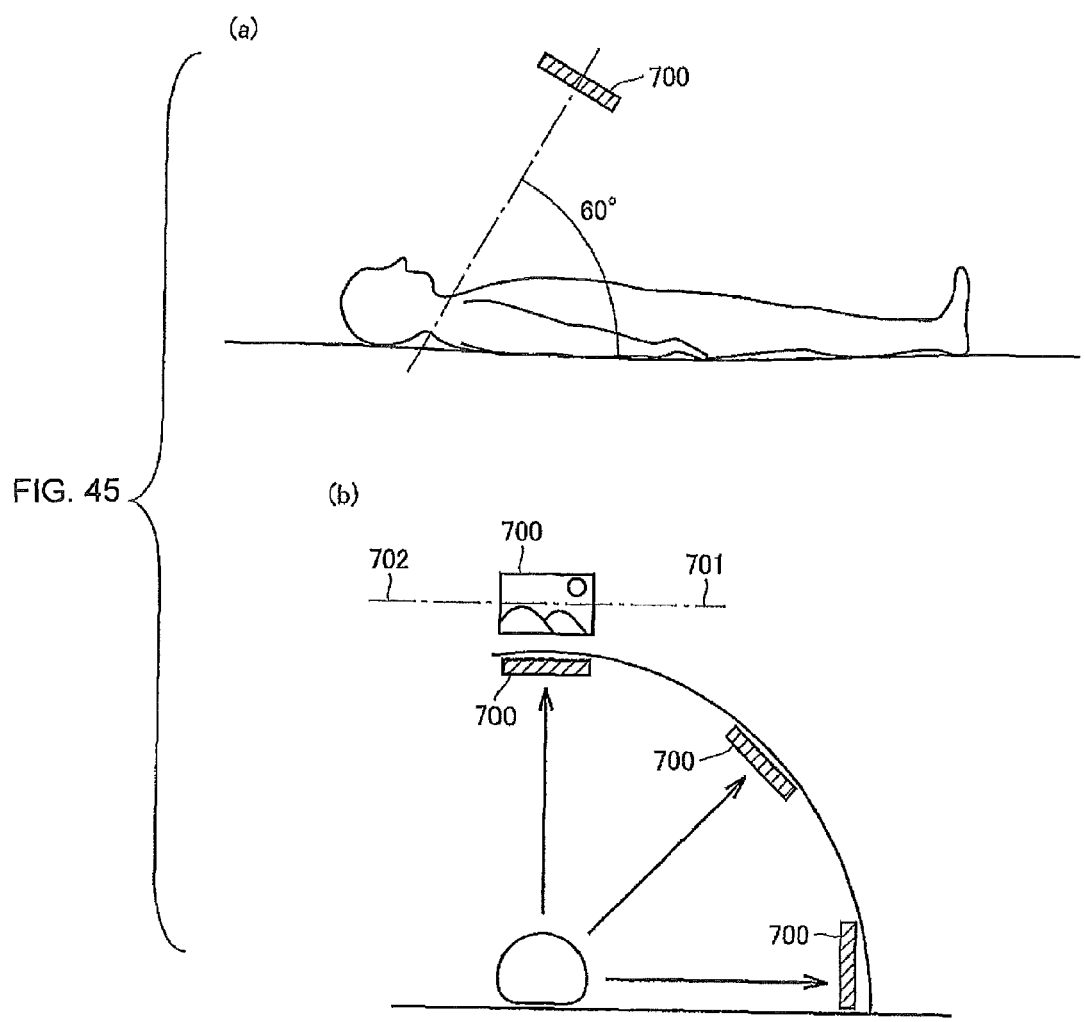
FIGS. 45(a) and 45(b) are diagrams showing an example in which the article holding device is applied to a visual object holding device, where
Figure 46:
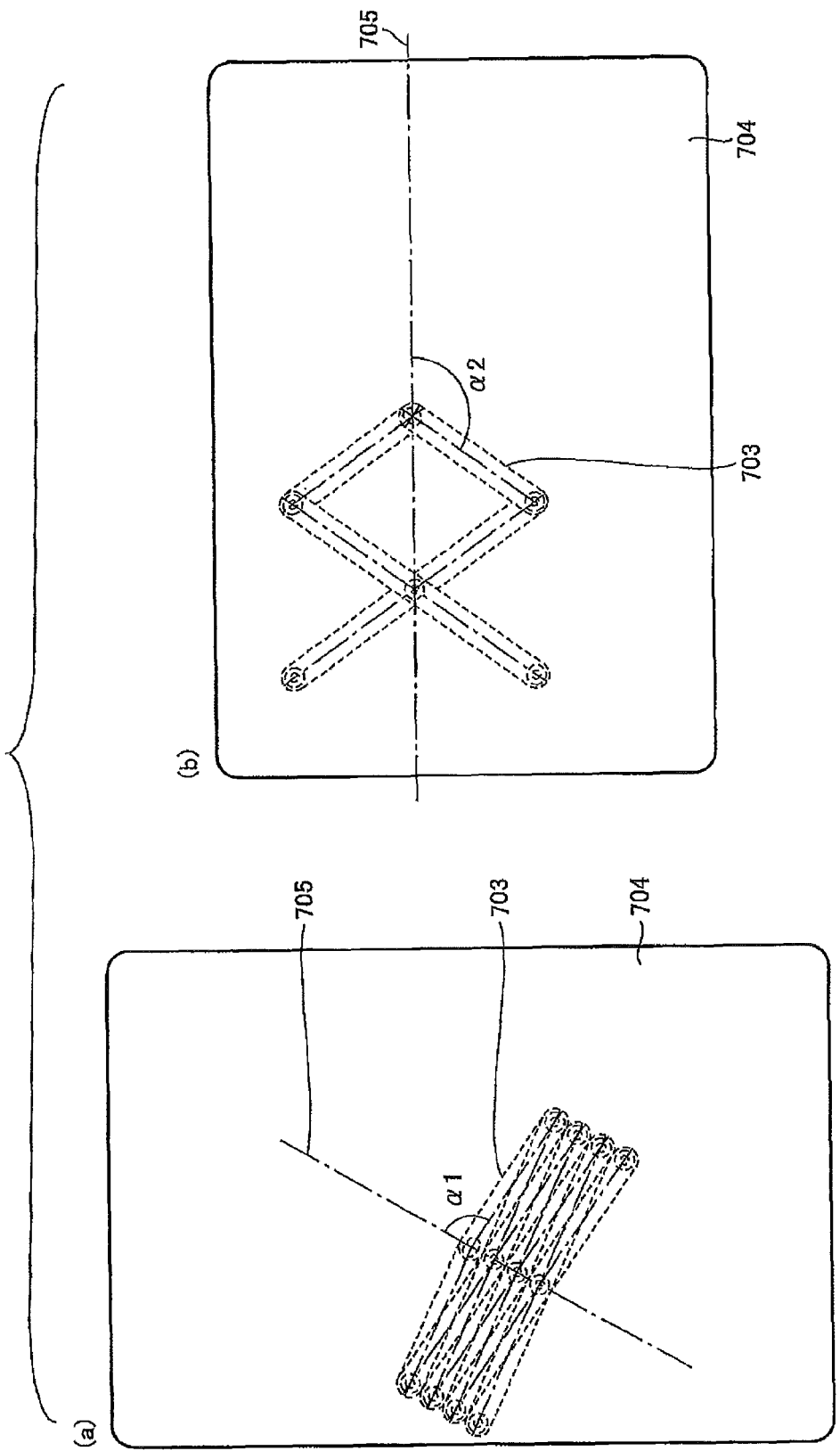
FIGS. 46(a) and 46(b) are diagrams showing a joint portion of the tip end of an extendable arm and a visual object.

FIGS. 45 to 46 show an example in which the article holding device is applied to a visual object holding device. Specifically, FIGS. 45 to 46 show an example in which a visual object holding device is attached to a bed. As shown in FIG. 45(*a*), a person lying on the bed can easily look at a visual object 700 when the trajectory of the extension/contraction operation of the extendable arm forms an angle of substantially 60 degrees with respect to a horizontal plane.

In the case of forming a visual object holding device that is attached to a bed, each rigid member forming an extendable arm is preferably curved in the thickness direction. By forming the extendable arm with the rigid members curved in the thickness direction, the visual object can provide a visual surface extending perpendicular to the face of the person lying on the bed as shown in FIG. 46(*b*), regardless of whether the extendable arm is in an extended state or in a contracted state.

The person lying on the bed looks at the visual object while lying on his/her side or on his/her back. In order to allow the person lying on the bed to easily look at the visual object in both lying postures, a coupling structure of the extendable arm and an article holding member (visual object holding member) is preferably configured so that the angle of the article holding member with respect to the longitudinal axis of the extendable arm changes according to the extraction/contraction operation of the extendable arm. If the extendable arm is in the most contracted state and the visual object 700 is located on the lateral side of the person lying on the bed, the visual surface of the visual object 700 is located at such an angular position that the person lying on his/her side on the bed can easily look at the visual object 700. If the extendable arm is extended and the visual object 700 is located on the line of sight of the person lying on his/her back on the bed, a central transverse line 702 of the visual surface of the visual object 700 is substantially parallel to a longitudinal axis 701 of the extendable arm, whereby the person lying on the bed can easily look at the visual object 700.

An example that implements the above operation is the structure in which one rigid member located at the tip end of the extendable arm is coupled at a fixed angle to the article holding member (visual object). FIGS. 46(*a*) and 46(*b*) show a joint portion of the extendable arm and the visual object. FIG. 46(*a*) shows the extendable arm in a contracted state, and FIG. 46(*b*) shows the extendable arm in an extended state. In the illustrated embodiment, one rigid member 703 located at the tip end of the extendable arm is coupled at a fixed angle to a visual object 704. Accordingly, if the angle of the rigid member 703 with respect to a longitudinal axis 705 of the extendable arm is changed from $\alpha 1$ to $\alpha 2$, the visual object 704 coupled at the fixed angle to the rigid member 703 is also changed in angle with respect to the longitudinal axis 705 of the extendable arm accordingly.

In the embodiment shown in FIGS. 46(a) and 46(b), the angle of the visual object is changed by using a change in angle of the rigid member located at the tip end. However, as other examples, the angle of the visual object may be changed according to a change in extension/contraction length of the extendable arm, or the angle of the visual object may be changed by using a gear etc. that operates according to the extension/contraction operation of the extendable arm.

<Detailed Structure>

Figure 42:
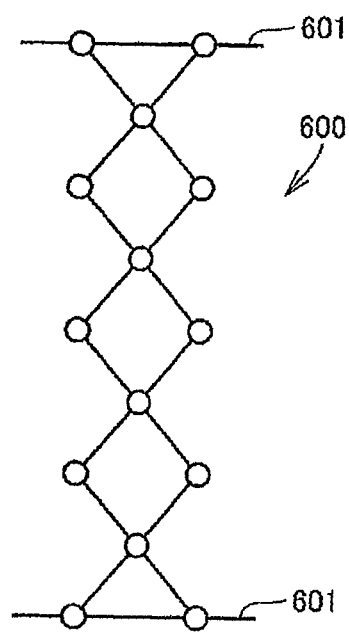
FIG. 42 is a diagram illustrating joint portions at both ends of an extendable arm.

Typically, in the case of forming a device that holds an article with an extendable arm, one end of the extendable arm is attached to a base member, and the other end thereof is attached to an article holding unit. In this case, the interval between the ends of a pair of rigid members located at each of the base and tip ends of the extendable arm changes according to the extended/contracted state of the extendable arm. FIG. 42 illustrates joint portions at both ends of an extendable arm 600. In order to permit a change in interval between the ends of the pair of rigid members which occurs according to the extension/contraction operation of the extendable arm 600, the ends of the pair of rigid members located at each extreme end in the longitudinal direction of the extendable arm 600 are slidably supported on a bar-shaped member 601.

In order to prohibit the extension/contraction operation of the extendable arm in the state where the extendable arm has been extended to a predetermined length, the angle of at least one cross link is fixed or the positions of the coupling points of adjoining ones of the rigid members are fixed.

The material forming the extendable arm is not particularly limited. Examples of the material forming the extendable arm include a metal, plastic, wood, ceramic, hard rubber, a composite material thereof, etc.

<Examples of Use of Extendable Arm>

The extendable arm can be used in various applications. Exemplary applications are listed below.

(a) Art objects and decorations

Arch shape, circular shape, spherical surface shape, cylindrical shape, wave shape, S-shape, helical shape, elliptical shape, conical shape, etc.

(b) Construction and structures

Towers, bridges, roofs, walls, windows, partitions, pillars, beams, shutters, fences, garage doors, staircases, road signs, and streetlights (c) Article holding devices Lighting devices, visual objects, clocks, microphones, speakers, accessories for beauty therapy machines, stationery, tableware, kitchenware, kitchen and bathroom products, household appliances, IT equipment, medical products, nursing care products, and rehabilitation products (d) Play equipment and toys Combination toys for playing by combining objects having various shapes (e) Furniture Chairs and beds (f) Houses for animals (g) Umbrellas and helmets using conical shapes (h) Robot arms (i) Hangers (j) Roofs of convertible cars (k) Decorative illuminations (l) Tents (m) Covers for fans (n) Shades of lighting devices

INDUSTRIAL APPLICABILITY

The present invention can be advantageously used as an extendable arm capable of stably forming a curved shape in a balanced manner.

REFERENCE SIGNS LIST

10 Extendable Arm
11 Cross Unit
11a, 11b Rigid Member
12, 13 Cross Unit
c Central Coupling Point
d, e Coupling Points at Both Ends
110 Rigid Member
20 Extendable Arm
21 Cross Unit
21a, 21b Rigid Member
22, 23 Cross Unit
210 Rigid Member
30 Extendable Arm
31 Cross Unit
31a, 31b Rigid Member
32, 33 Cross Unit
40 Extendable Arm
41 Cross Unit
41a, 41b Rigid Member
46 Spacer
50 Extendable Arm
51a, 51b Rigid Member
60 Extendable Arm
61 Lighting Unit
62 Extendable Arm
63 Hook
64 Extendable Arm
65 Armrest
66 Beverage Holder
67, 68, 69 Extendable Arm
300 Desk Lamp
301 Base Member
302 Extendable Arm
303 Lighting Unit
310 Desk Lamp
311 Base Member
312 Extendable Arm
313 Lighting Unit
320 Desk Lamp
321 Base Unit
321a Base Member
321b Extendable Arm
321c Upper Plate
322 Extendable Arm
323 Lighting Unit
330 Bed Structure with Extendable Arm
331 Bed
332 Base Member
333 Extendable Arm
334 Article Holding Unit
335 Visual Object
340 Bed Structure with Extendable Arm
341 First Extendable Arm
342 Second Extendable Arm
343 Article Holding Unit
344 Visual Object
350 Article Holding Device
351 Base Member
352 Extendable Arm 353 Lighting Unit
355 Piece of Furniture
360 Article Holding Device
361 Base Member
362 Extendable Arm
400 Television Display Holding Device
401 Extendable Arm
402 Television Display
500 Television Display Holding Device
501 Extendable Arm
502 Television Display
600 Extendable Arm
601 Bar-Shaped Member
700 Visual Object
701 Longitudinal Axis of Extendable Arm
702 Central Transverse Line of Visual Surface
703 One Rigid Member Located at Tip End of Extendable Arm
704 Visual Object
705 Longitudinal Axis of Extendable Arm

The invention claimed is:

1. An extendable arm comprising:
a plurality of cross units arranged in one direction and pivotally coupled to each other, each of said cross units comprising two rigid members that are pivotally coupled at a central coupling point so as to cross over each other to form an X-shape, wherein
in order for said extendable arm to follow a curved-line path when being extended and contracted, each of said rigid members has such a curved shape that coupling points at both ends of said rigid member are shifted toward one side from a longitudinal axis passing through said central coupling point, and
said rigid member has a linear shape in its central region in a longitudinal direction of said rigid member.

2. A three-dimensional object formed by using said extendable arm according to claim 1, wherein
a three-dimensional shape that is formed by said extendable arm in a deployed state forms a surface selected from the group consisting of a cylindrical surface, a conical surface, and a spherical surface.

3. A three-dimensional object formed by using said extendable arm according to claim 1, wherein
a three-dimensional shape that is formed by said extendable arm in a deployed state forms a shape selected from the group consisting of an arc shape, a helical shape, an arch shape, and a wave shape.

4. An extendable arm comprising:
a plurality of cross units arranged in one direction and pivotally coupled to each other, each of said cross units comprising two rigid members that are pivotally coupled at a central coupling point so as to cross over each other to form an X-shape, wherein
in order for said extendable arm to follow a curved-line path when being extended and contracted, each of said rigid members has such a curved shape that coupling points at both ends of said rigid member are shifted toward one side from a longitudinal axis passing through said central coupling point,
said coupling points at said both ends of said rigid member are shifted in a lateral direction of said rigid member, and
a curve that passes through said coupling points at said both ends and said central coupling point of said rigid member is curved with a uniform radius of curvature.

5. The extendable arm according to claim 4, wherein
said rigid member has a shape that is curved with a uniform radius of curvature along its entire longitudinal length.

6. A three-dimensional object formed by using said extendable arm according to claim 4, wherein
a three-dimensional shape that is formed by said extendable arm in a deployed state forms a surface selected from the group consisting of a cylindrical surface, a conical surface, and a spherical surface.

7. A three-dimensional object formed by using said extendable arm according to claim 4, wherein
a three-dimensional shape that is formed by said extendable arm in a deployed state forms a shape selected from the group consisting of an arc shape, a helical shape, an arch shape, and a wave shape.

8. An extendable arm comprising:
a plurality of cross units arranged in one direction and pivotally coupled to each other, each of said cross units comprising two rigid members that are pivotally coupled at a central coupling point so as to cross over each other to form an X-shape, wherein
in order for said extendable arm to follow a curved-line path when being extended and contracted, each of said rigid members has such a curved shape that coupling points at both ends of said rigid member are shifted toward one side from a longitudinal axis passing through said central coupling point, and
said coupling points at said both ends of said rigid member are shifted in a thickness direction of said rigid member and in a lateral direction of said rigid member.

9. The extendable arm according to claim 8, wherein
said rigid member has a shape that is curved with a uniform radius of curvature along its entire longitudinal length.

10. A three-dimensional object formed by using said extendable arm according to claim 8, wherein
a three-dimensional shape that is formed by said extendable arm in a deployed state forms a surface selected from the group consisting of a cylindrical surface, a conical surface, and a spherical surface.

11. A three-dimensional object formed by using said extendable arm according to claim 8, wherein
a three-dimensional shape that is formed by said extendable arm in a deployed state forms a shape selected from the group consisting of an arc shape, a helical shape, an arch shape, and a wave shape.

12. A three-dimensional object, comprising:
a plurality of extendable arms each comprising a plurality of cross units arranged in one direction and pivotally coupled to each other, each of said cross units comprising two rigid members that are pivotally coupled at a central coupling point so as to cross over each other to form an X-shape, wherein
in order for said extendable arm to follow a curved-line path when being extended and contracted, each of said rigid members has such a curved shape that coupling points at both ends of said rigid member are shifted toward one side from a longitudinal axis passing through said central coupling point, and
a partition is formed by coupling said plurality of extendable arms in a lateral direction crossing a longitudinal direction.

13. A desk lamp, comprising: an extendable arm; a base member supporting a base end of said extendable arm; a lighting unit attached to a tip end of said extendable arm; and an electrical cord extending from said base member to said lighting unit, wherein
said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, said extendable arm has clearance that allows said electrical cord extending from said base member to said lighting unit to extend therethrough, said coupling points at said both ends of said rigid member are shifted in a thickness direction of said rigid member, and said lighting unit emits light to the same position regardless of whether said extendable arm is in an extended state or in a contracted state.

14. A desk lamp, comprising: an extendable arm; and a lighting unit attached to a tip end of said extendable arm, wherein said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted in a lateral direction of said rigid member from a longitudinal axis passing through said central coupling point, and a direction in which said lighting unit emits light is the same regardless of whether said extendable arm is in an extended state or in a contracted state.

15. An article holding device, comprising:
a bed;
an extendable arm that can be extended and contracted and that extends in a greatly curved shape from a side of said bed to a position above a face of a person lying on said bed when in an extended state; and
an article holding member attached to said extendable arm, wherein said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, and a trajectory of an extension/contraction operation of said extendable arm forms a tilt angle with respect to a horizontal plane.

16. The article holding device according to claim 15, wherein
said coupling points at said both ends of said rigid member are shifted in a thickness direction of said rigid member,
said article holding member holds a visual object, and
said visual object held by said article holding member provides a visual surface that faces toward said face of said person lying on said bed regardless of whether said extendable arm is in an extended state or in a contracted state.

17. The article holding device according to claim 15, further comprising:
a base member, wherein
a base end of said extendable arm is rotatably supported by said base member.

18. An article holding device, comprising:
a bed;
an extendable arm that can be extended and contracted and that extends in a greatly curved shape from a side of said bed to a position above a face of a person lying on said bed when in an extended state; and
an article holding member attached to said extendable arm, wherein said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, a coupling structure of said extendable arm and said article holding member is configured so that an angle of said article holding member with respect to an extended direction of said curved-line path of said extendable arm changes according to an extension/contraction operation of said extendable arm, one rigid member located at a tip end of said extendable arm is coupled at a fixed angle to said article holding member, and said angle of said article holding member with respect to the extended direction of said curved-line path of said extendable arm changes according to an extension/contraction length of said extendable arm.

19. An article holding device, comprising:
an extendable arm that can be extended and contracted and that extends in a greatly curved shape when in an extended state; and
an article holder attached to said extendable arm, wherein said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, said coupling points at said both ends of said rigid member are shifted in a lateral direction of said rigid member, and the number of at least one of said two rigid members is more than one.

20. The article holding device according to claim 19, wherein
said coupling points at said both ends of said rigid member are shifted in said lateral direction of said rigid member and in a thickness direction of said rigid member.

21. A combination toy including a plurality of extendable arms, for playing by combining said plurality of extendable arms, each of said extendable arms comprising a plurality of cross units arranged in one direction and pivotally coupled to each other, and each of said cross units comprising two rigid members that are pivotally coupled at a central coupling point so as to cross over each other to form an X-shape, wherein in order for said extendable arm to follow a curved-line path when being extended and contracted, each of said rigid members has such a curved shape that coupling points at both ends of said rigid member are shifted toward one side from a longitudinal axis passing through said central coupling point.

22. An extendable arm comprising a plurality of cross units arranged in one direction and pivotally coupled to each other, each of said cross units comprising first and second rigid members that are pivotally coupled at a central coupling point so as to cross over each other to form an X-shape, wherein in order for said extendable arm to follow a curved-line path when being extended and contracted, each of said rigid members has such a curved shape that coupling points at both ends of said rigid member are shifted toward one side from a longitudinal axis passing through said central coupling point, and said first rigid member comprises a pair of rigid elements which are provided at an interval in a thickness direction, and said second rigid member is interposed between said pair of rigid elements of said first rigid member.

23. A three-dimensional object, comprising:

an extendable arm comprising a plurality of cross units arranged in one direction and pivotally coupled to each other, each of said cross units comprising two rigid members that are pivotally coupled at a central coupling point so as to cross over each other to form an X-shape, wherein in order for said extendable arm to follow a curved-line path when being extended and contracted, each of said rigid members has such a curved shape that coupling points at both ends of said rigid member are shifted in a thickness direction of said rigid member from a longitudinal axis passing through said central coupling point, three axes in said thickness direction which pass through said central coupling point and said coupling points at said both ends of said rigid member converge on one point, said rigid member has a semicircular shape in which an included angle between said both ends of said rigid member about said convergence point is 180 degrees, and said extendable arm forms a sphere when in a deployed state.

24. A three-dimensional object, comprising:

a plurality of extendable arms comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, and a cylindrical surface is formed by coupling said plurality of extendable arms in a lateral direction crossing a longitudinal direction.

25. A desk lamp, comprising: an extendable arm; and a lighting unit attached to a tip end of said extendable arm, wherein said extendable arm comprising a plurality of cross units arranged in one direction and pivotally coupled to each other, each of said cross units comprising first and second rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, and said first rigid member comprises a pair of rigid elements which are provided at an interval in a thickness direction, and said second rigid member is interposed between said pair of rigid elements of said first rigid member.

26. A desk lamp, comprising: an extendable arm; and a lighting unit attached to a tip end of said extendable arm, wherein said extendable arm comprising a plurality of cross units arranged in one direction and pivotally coupled to each other, each of said cross units comprising two rigid members that are pivotally coupled at a central coupling point so as to cross over each other to form an X-shape, in order for said extendable arm to follow a curved-line path when being extended and contracted, each of said rigid members has such a curved shape that coupling points at both ends of said rigid member are shifted toward one side from a longitudinal axis passing through said central coupling point, and said coupling points at said both ends of said rigid member are shifted in a thickness direction of said rigid member and in a lateral direction of said rigid member.

* * * * *